United States Patent
Ai et al.

(10) Patent No.: US 8,277,350 B2
(45) Date of Patent: Oct. 2, 2012

(54) TWO MODE ELECTRO-MECHANICAL TRANSMISSION AND CONTROL

(75) Inventors: Xiaolin Ai, Beijing (CN); Xiaozhi Ai, Shenzhen (CN); Rui Xue, Beijing (CN); Zhonghe Xue, Beijing (CN)

(73) Assignee: AI, Xiaolin, Beijing (CN)

( * ) Notice: Subject to any disclaimer, the term of this patent is extended or adjusted under 35 U.S.C. 154(b) by 821 days.

(21) Appl. No.: 12/304,870

(22) PCT Filed: Apr. 10, 2007

(86) PCT No.: PCT/CN2007/001159
§ 371 (c)(1),
(2), (4) Date: Dec. 15, 2008

(87) PCT Pub. No.: WO2008/000126
PCT Pub. Date: Jan. 3, 2008

(65) Prior Publication Data
US 2009/0209381 A1    Aug. 20, 2009

(30) Foreign Application Priority Data
Jun. 19, 2006  (CN) .......................... 2006 1 0086807

(51) Int. Cl.
*F16H 37/06* (2006.01)
(52) U.S. Cl. ........................................ 475/5; 180/65.285
(58) Field of Classification Search ....... 475/5; 477/3–7; 180/65.1, 65.285, 65.235
See application file for complete search history.

(56) References Cited

U.S. PATENT DOCUMENTS

| | | | |
|---|---|---|---|
| 6,371,882 B1 * | 4/2002 | Casey et al. ........................ | 477/5 |
| 6,551,208 B1 * | 4/2003 | Holmes et al. ..................... | 475/5 |
| 6,964,627 B2 * | 11/2005 | Ai et al. ............................. | 475/5 |
| 7,070,530 B2 * | 7/2006 | Ai et al. ............................. | 475/5 |
| 2007/0265127 A1 * | 11/2007 | Raghavan et al. ................. | 475/5 |
| 2008/0039257 A1 * | 2/2008 | Holmes .............................. | 475/5 |
| 2009/0275438 A1 * | 11/2009 | Kersting ........................... | 475/5 |
| 2010/0261565 A1 * | 10/2010 | Ai et al. ............................. | 475/5 |

FOREIGN PATENT DOCUMENTS

| | | |
|---|---|---|
| CN | 1563743 A | 1/2005 |
| CN | 1696545 A | 11/2005 |
| CN | 1563743 | * 12/2005 |
| WO | 2005021310 | 3/2005 |
| WO | WO 2005/021310 | * 10/2005 |

* cited by examiner

*Primary Examiner* — Katy M Ebner
*Assistant Examiner* — Emma K Frick
(74) *Attorney, Agent, or Firm* — Lucas & Mercanti, LLP

(57) ABSTRACT

A two mode power-split electric hybrid system and a method of control said hybrid system. The hybrid system is comprised of an engine, a transmission, an energy storage device and a control system for effecting said control method. Said transmission is a reconfigurable power split system, comprising a power-splitting device and an output power path selecting device. The power splitting device includes a compound planetary gear system and two electric machines which form a local series electric hybrid system. Said transmission regulates the output power state of said hybrid system by controlling power flow within said local series hybrid system. The hybrid system provides at least two operating mode, an output power split mode and a compound power split mode. Said control system includes multiple controllers and control modules. In accordance with the operating conditions of the hybrid system, said control system computes and sets system power requirement, allocates ob board power resources and sets engine operating speed and torque. In addition, said control system sets the operation mode of the transmission and controls the engine speed by adjusting operating torque of electric machines, based on the differential signal between reference engine speed and actual engine speed. Said control system is also capable of controlling engine torque through engine controller.

18 Claims, 13 Drawing Sheets

Schematic diagram of hybrid vehicle drive system

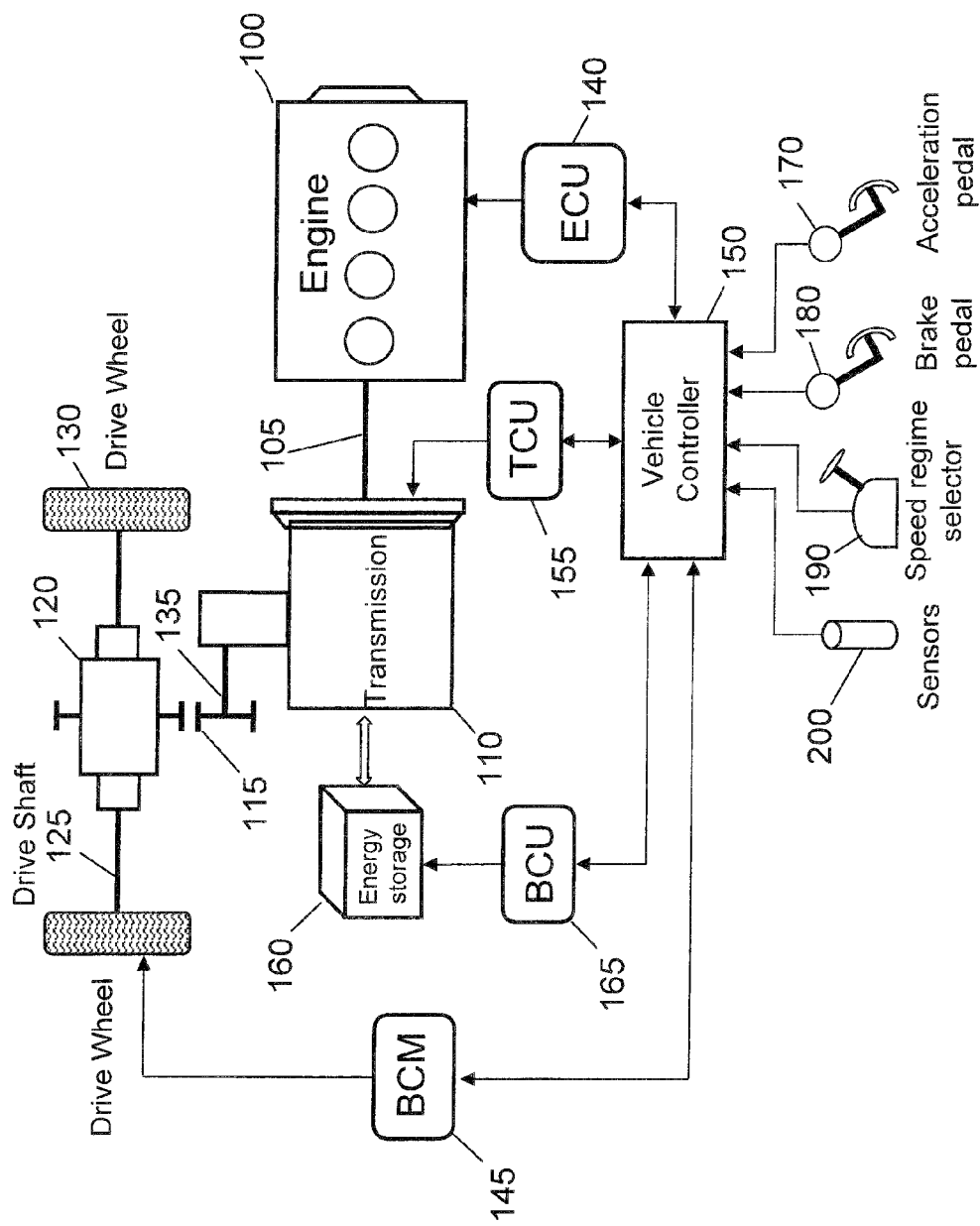
Figure 1 Schematic diagram of hybrid vehicle drive system

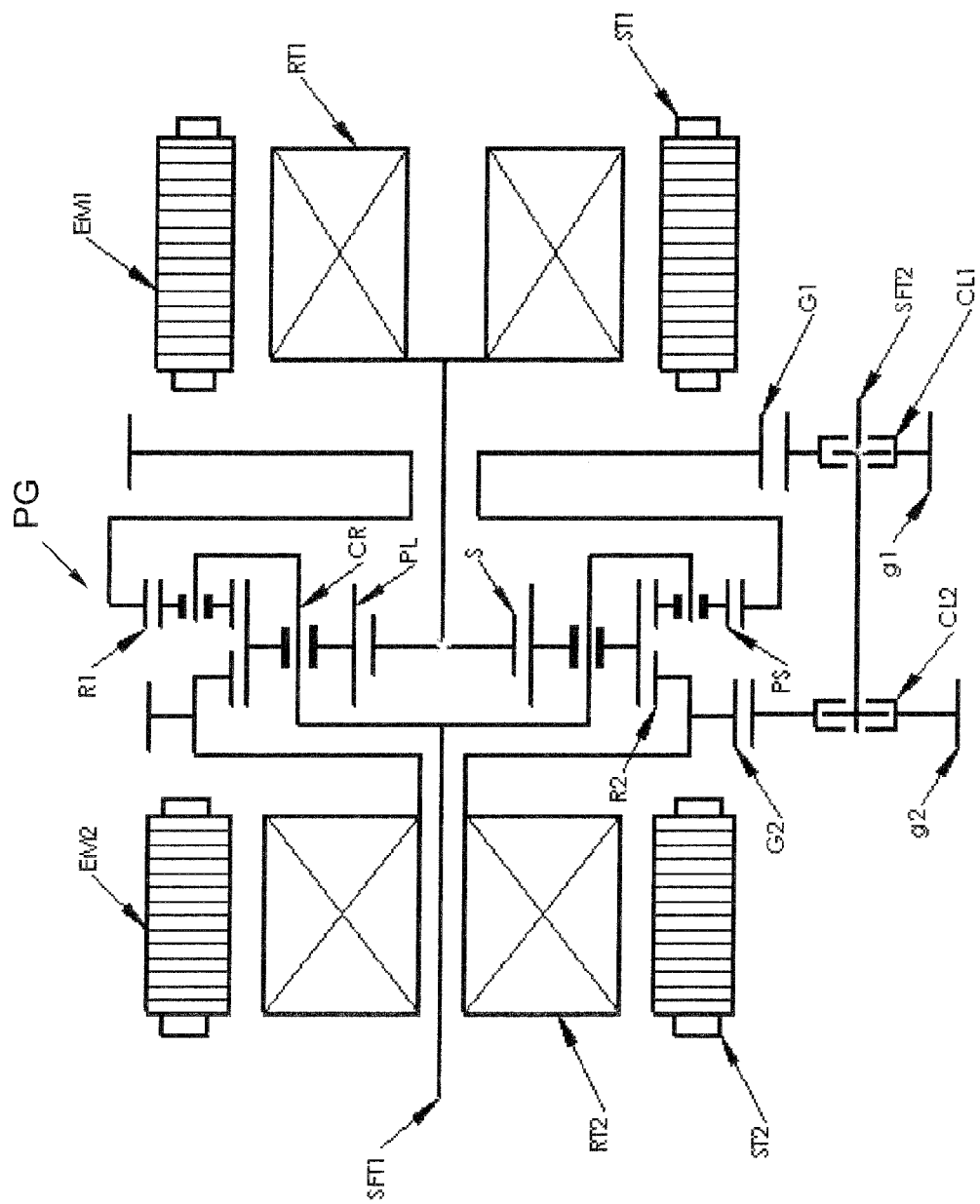
Figure 2 Schematic diagram of the preferred embodiment of the electro-mechanical transmission of current invention

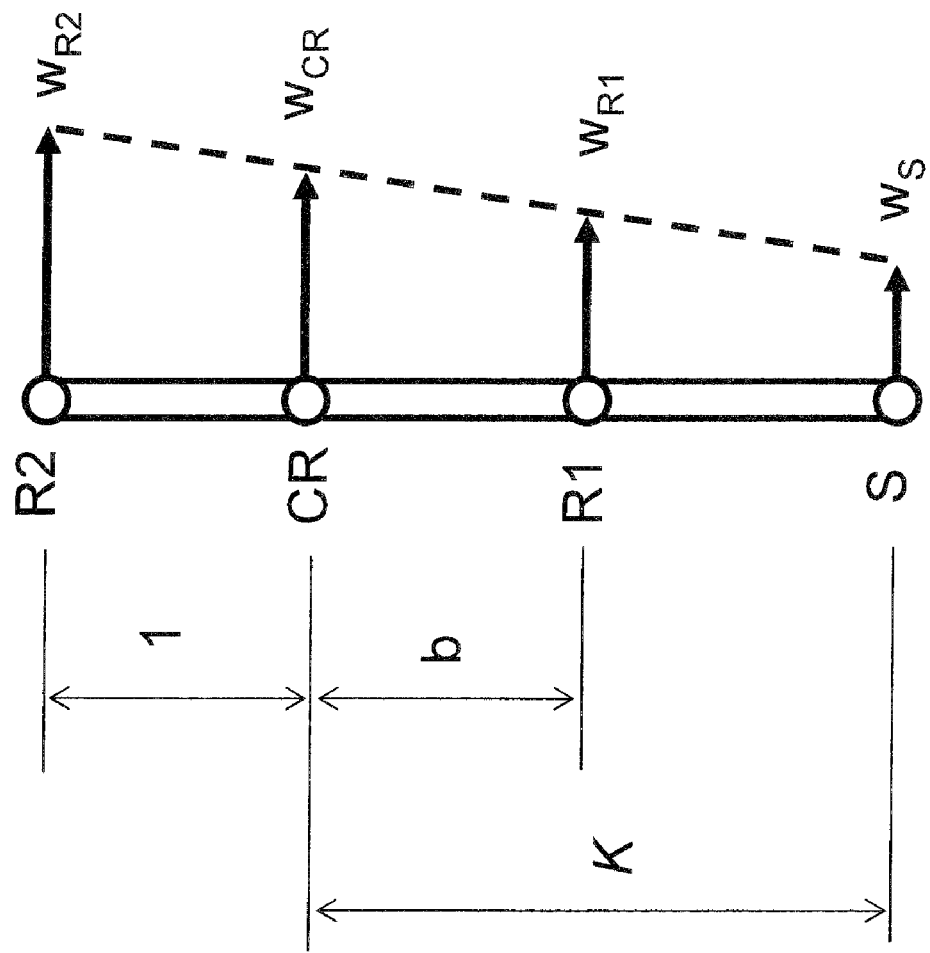
Figure 3 Four-branch speed monograph

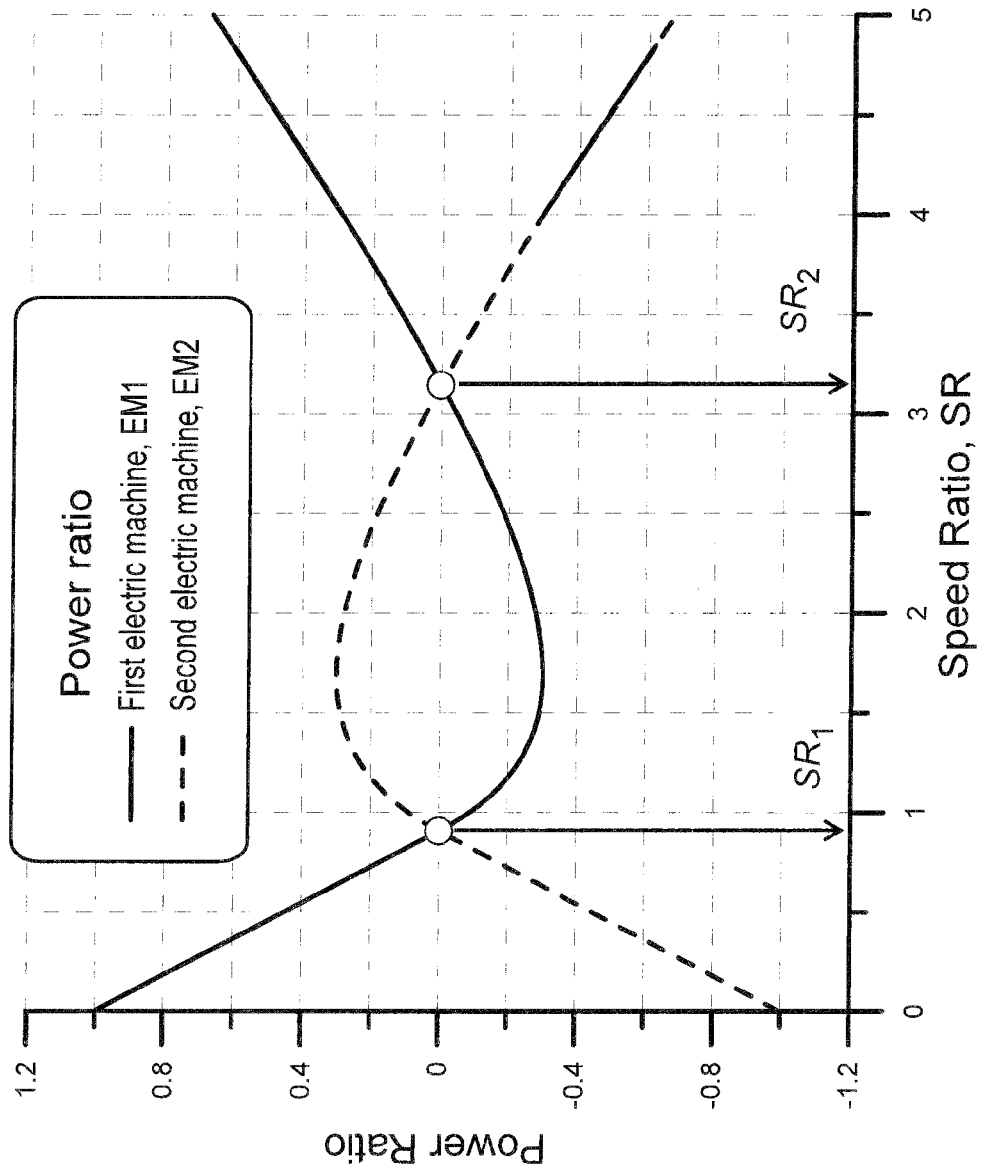
Figure 4 Power ratio plot of electric power to combined transmission power as a function of output to input speed ratio

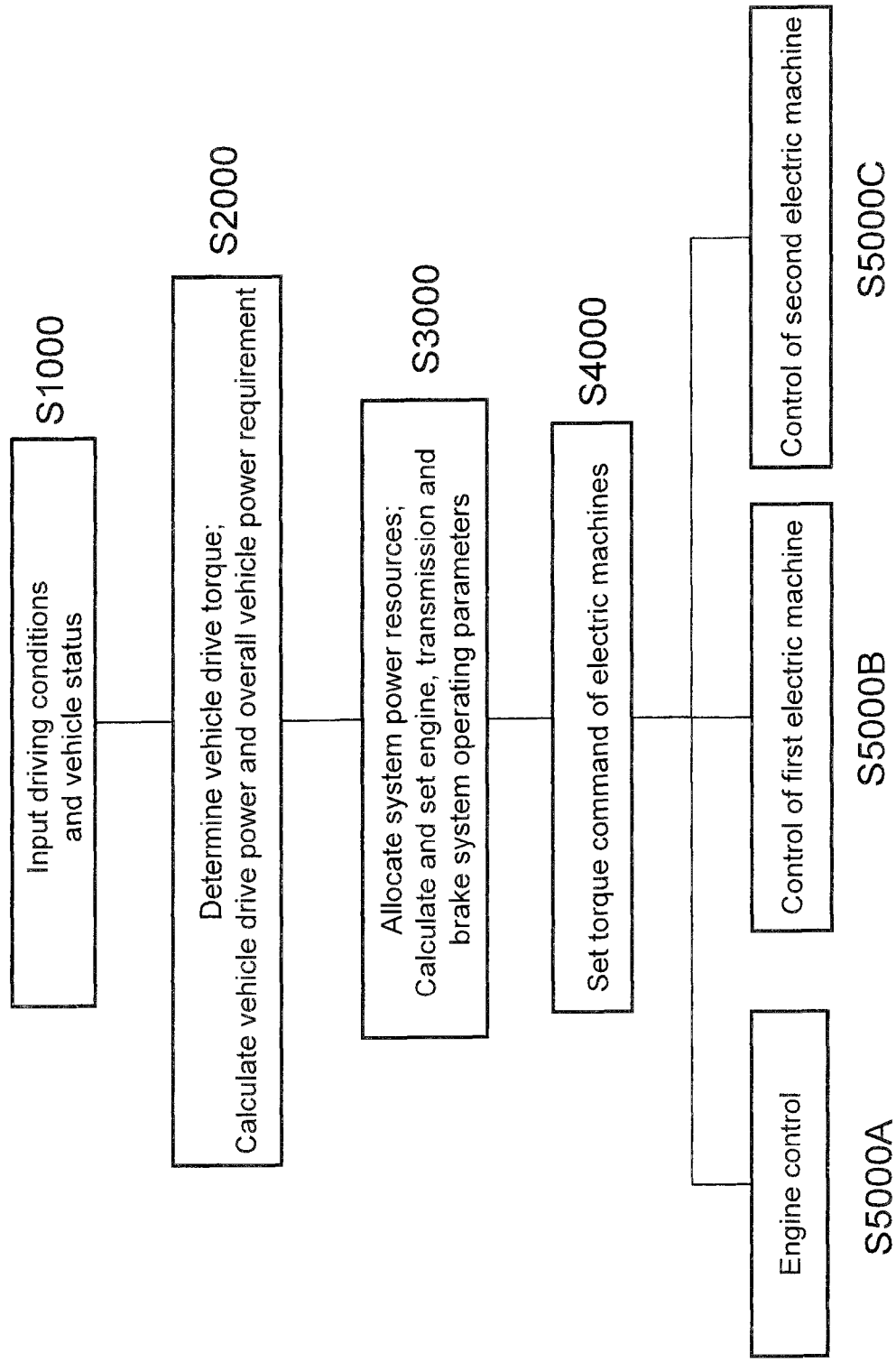
Figure 5 Control flow chart of the electric hybrid system

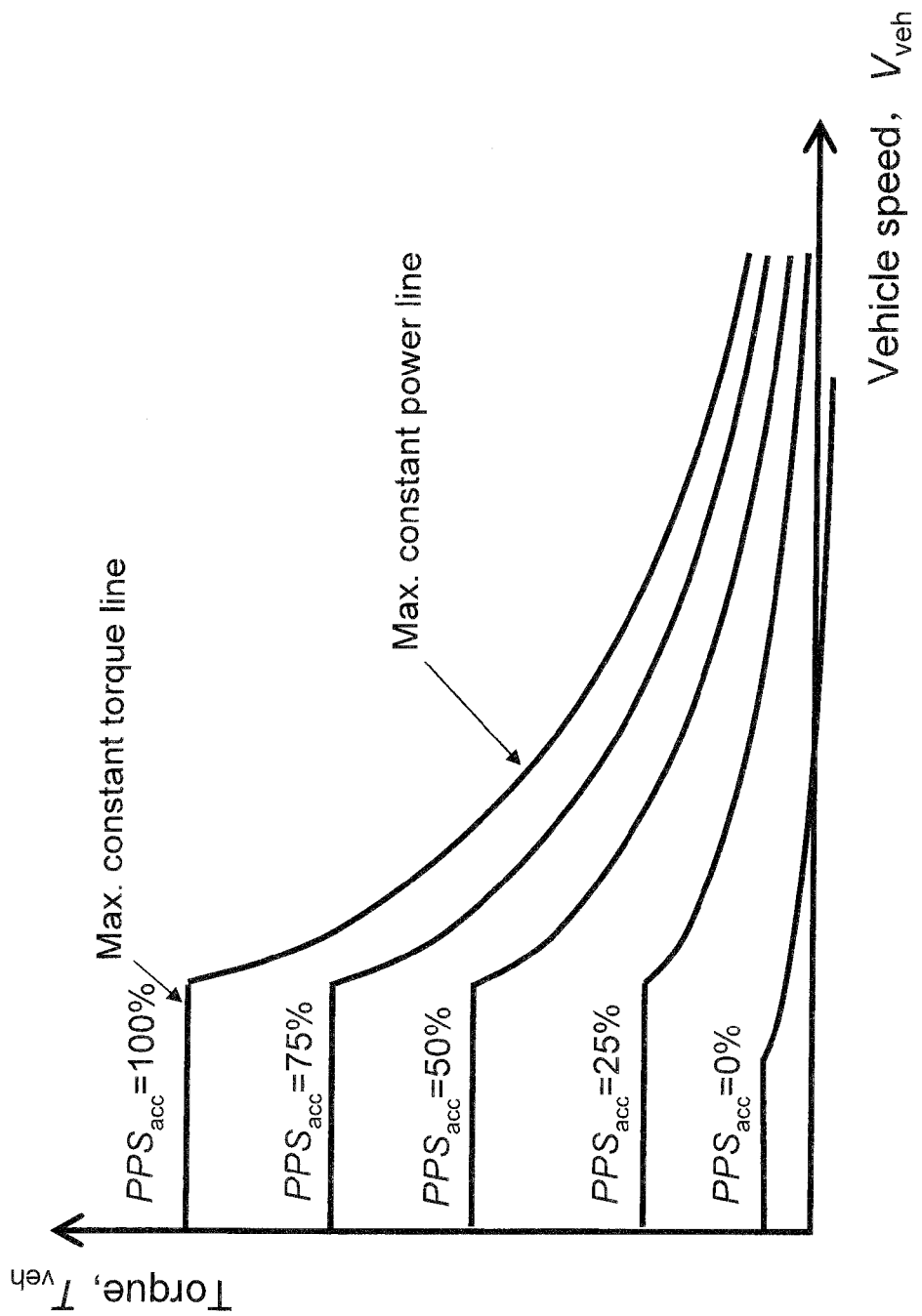
Figure 6 Schematic curves showing the relationship between drive torque, acceleration pedal position and vehicle speed

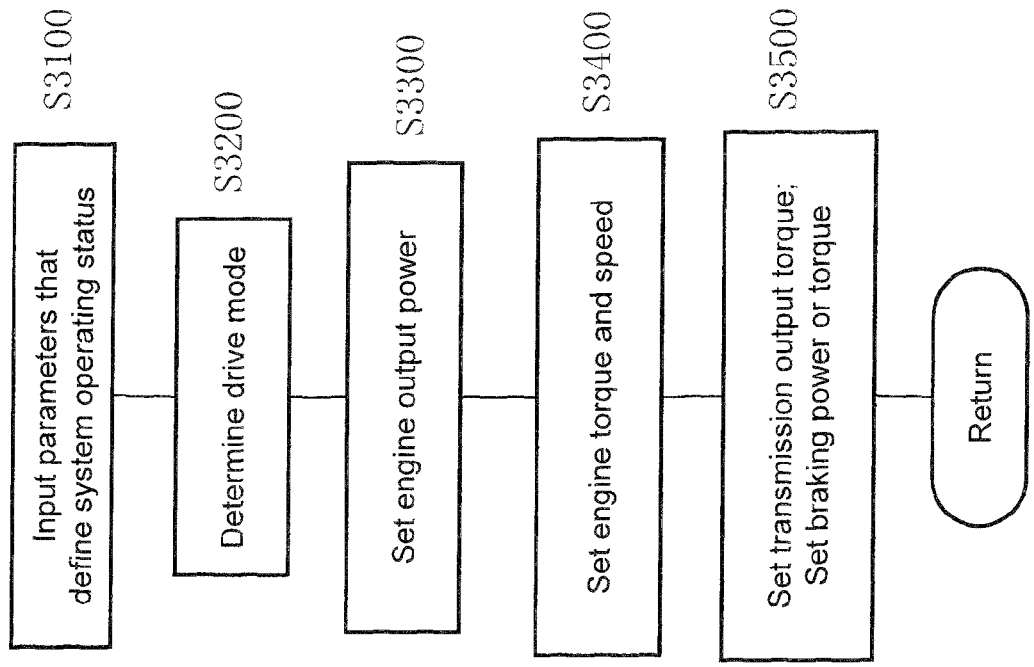
Figure 7 Flow chart used to illustrate the determination of engine and power-train operating parameters;

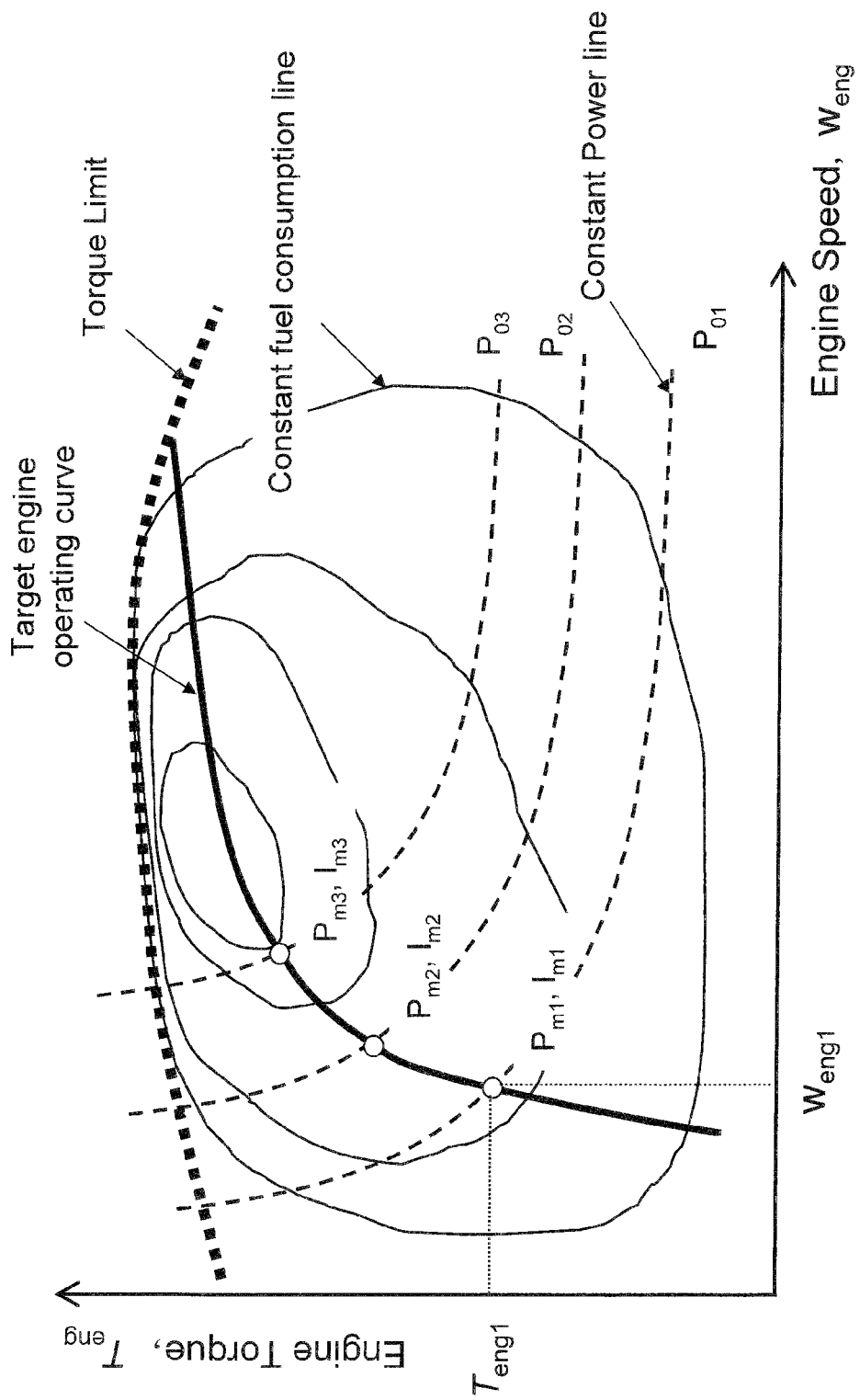
Figure 8 Schematic of contact power and brake specific fuel consumption lines for a typical engine used for determining the engine target curve and operating states

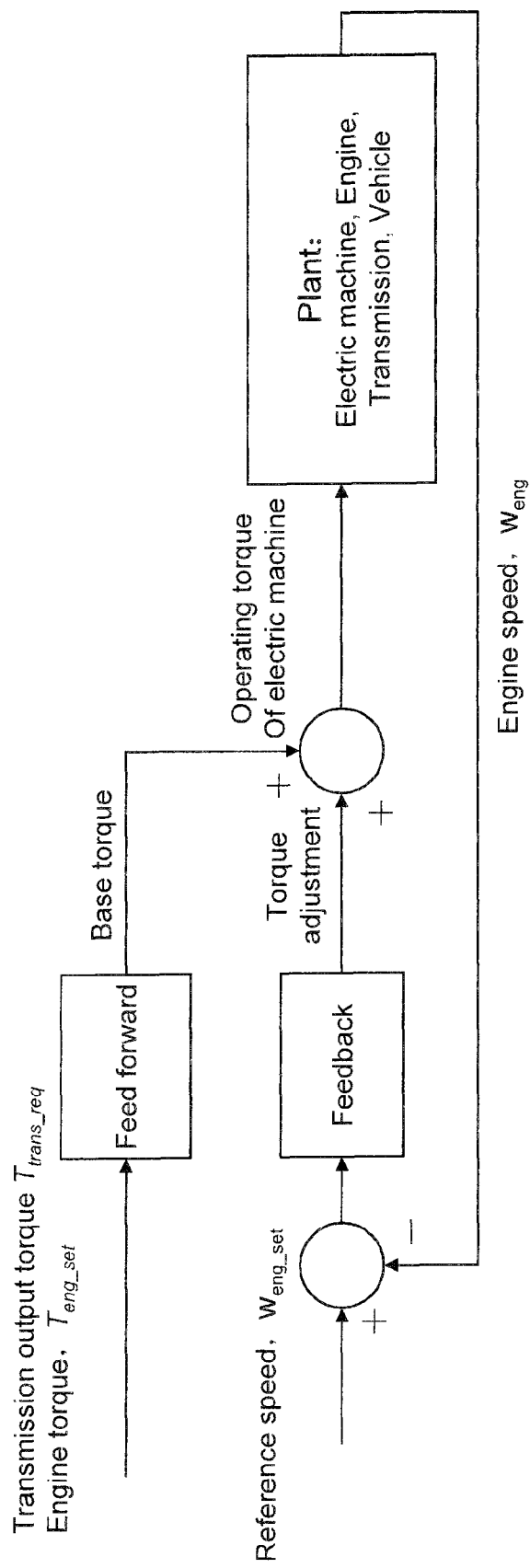
Figure 9 A control loop block diagram for engine speed control

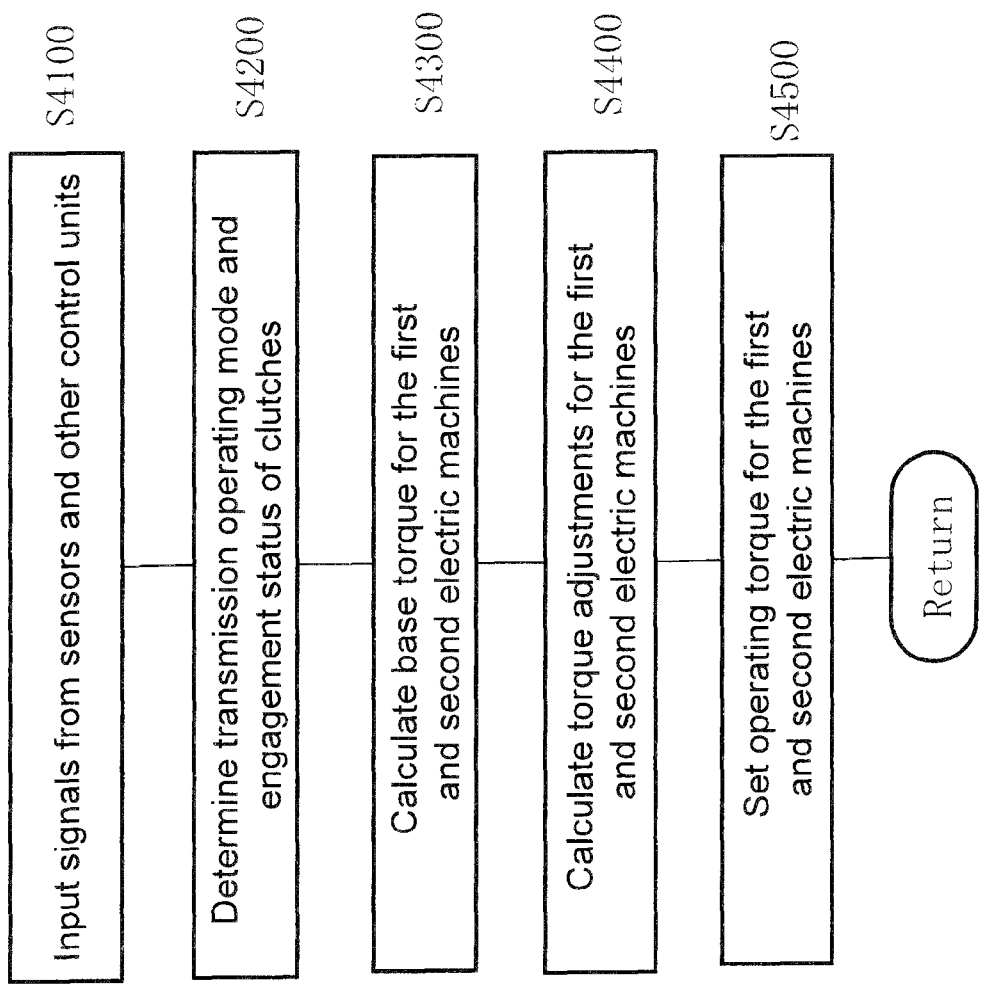
Figure 10 a flow chart describing torque command setting for the electric machines

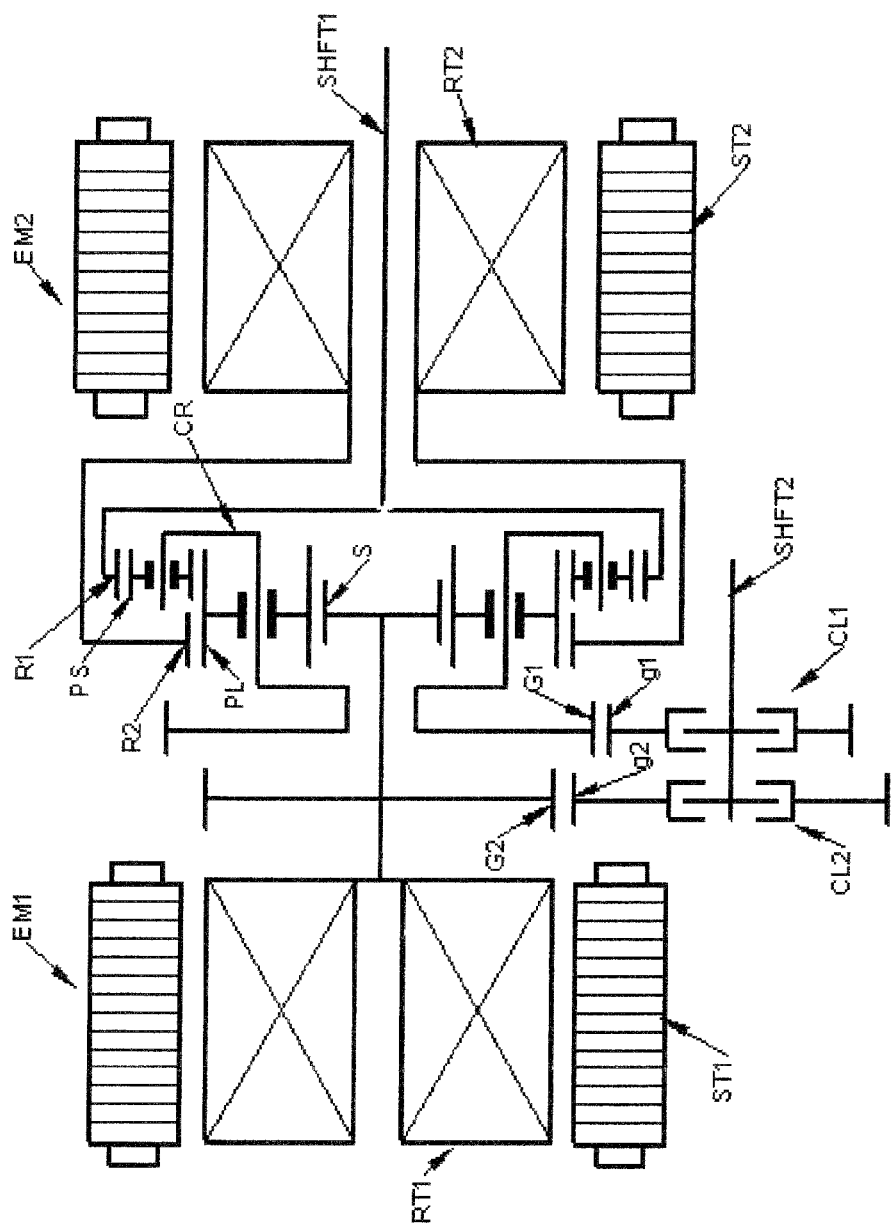
Figure 11 Schematic diagram of another preferred embodiment of the electro-mechanical transmission of current invention

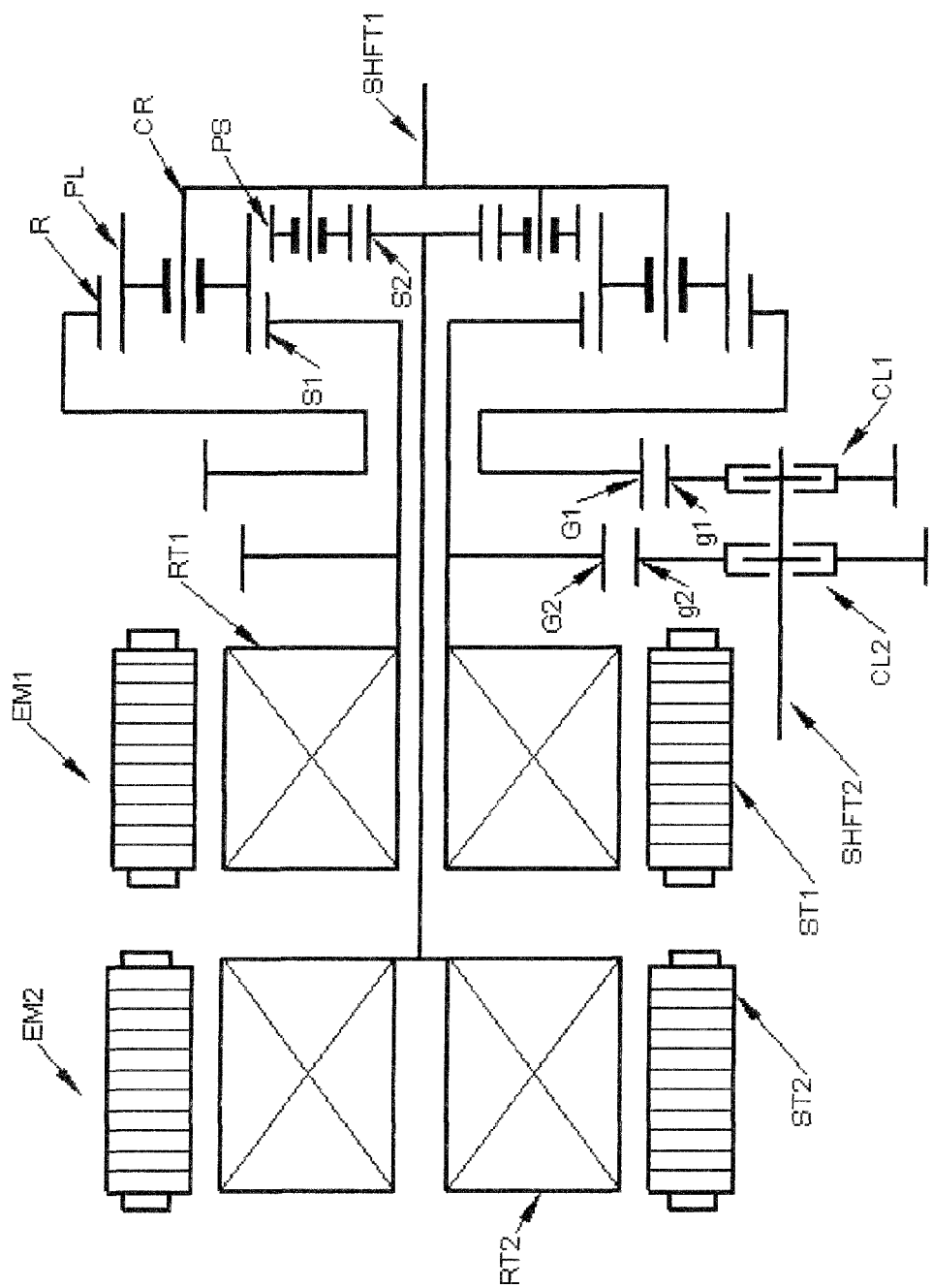
Figure 12 Schematic diagram of another embodiment of the electro-mechanical transmission of current invention

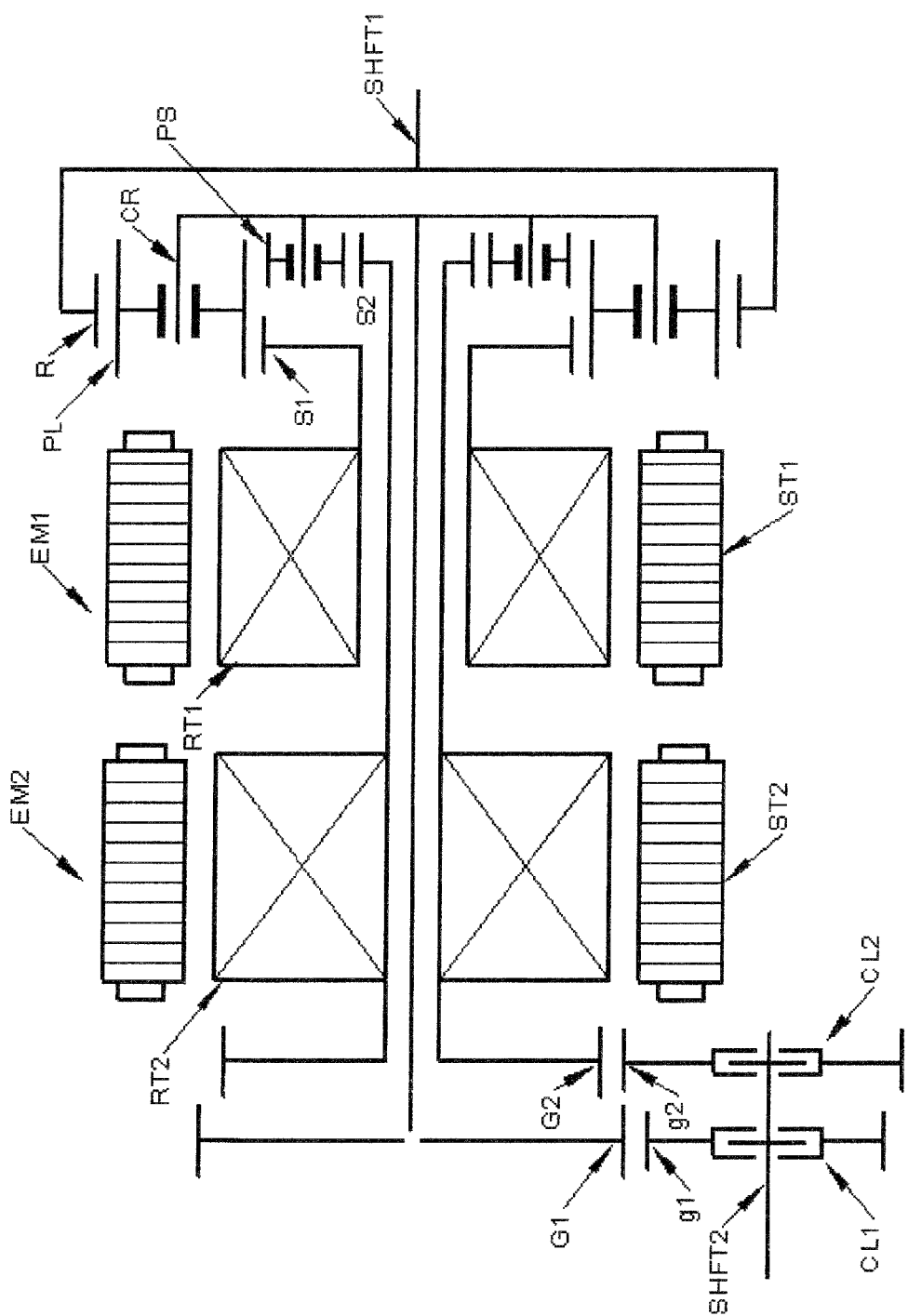
Figure 13 Schematic diagram of another embodiment of the electro-mechanical transmission of current invention

TWO MODE ELECTRO-MECHANICAL TRANSMISSION AND CONTROL

BACKGROUND OF THE INVENTION

This invention relates to hybrid systems and control methods in general and describes a two mode electro-mechanical transmission and its control in particular.

A power-train includes a power generator and a power transmission system. The internal combustion engine is the most common form of power generator. The power transmission system further includes a transmission, a differential and drive shafts. Engines have limited speed and torque ranges. Within these ranges, there are usually small regimes where engine can achieve optimal operation in terms of the lowest fuel consumption, the lowest emission or the highest performance. On the other hand, vehicle demands vary widely not only in power but also in torque and speeds. To facilitate discussion, a combination of torque and speed at the end of an input or output shaft is defined hereafter as a power state. A given power can be produced at or delivered with different combinations of torque and speed, and therefore has different power states. It can be seen that, engine and vehicle can have different power states. Matching these power states is the primary task of the transmission.

There are two types of transmissions commonly seen today on the marketplace, the stepwise and the step-less. The stepwise transmissions are further classified into manual transmissions and automatic transmissions. Through selecting appropriate gears for power transmission, they offer a limited number of gear ratios. Between two adjacent gear ratios, vehicle speed is regulated through change in engine speed.

Step-less transmissions are capable of providing, within a range, an infinite number of gear ratios. Vehicle speed can be fully regulated through continuous change of gear ratio without affecting engine speed. Thus engine can be operated at its optimal speed region. In addition, step-less transmissions offer other advantages over stepwise transmissions such as driving comfort, and are able to best utilize engine's maximum power over wide vehicle speeds. For this reason, stepless transmissions have received increase attention over the years. Two particular types of step-less transmissions, the toroidal traction drive and the belt function drive, have been successfully made to marketplace. The belt drives are the most popular among step-less transmissions.

The above mentioned conventional transmissions are not able to provide complete matches in power and in power states between the vehicle and engine. This is due to the fact that the conventional transmissions are designed to regulate speed or torque, but not power. The input power of the transmission is always equal to the output power assuming no internal power loss. In other words, the transmission can not regulate both output speed and torque independently.

The emerging concepts of hybrid power-trains, have opened a new avenue for power transmission and regulation. Among various concepts proposed, the series electric hybrid systems and parallel electric hybrid systems are the most simple and representative ones. The series hybrid system is the simplest power-train configuration, where the engine, generator, motor and driveline form a single series power path. The generator and motor set can be regarded as a stepless transmission. When used with energy storage devices, such as battery or capacitor, the transmission is able to regular output power in addition to regulating output speed. In this sense, the transmission is capable of controlling independently both output speed and torque.

In parallel hybrid system, there exist two independent parallel power paths from power sources to drive wheels. One is formed by the conventional mechanical drive line, referred to as the mechanical power path, the other is formed by a battery pack and an electric machine, referred to as the electric power path. The mechanical power path provides speed regulation as with the conventional power-train system, the electric power path provides power regulation or independent torque regulation. To achieve the best possible performance, it is desirable to use step-less transmission in the mechanical power path.

The advantages of series hybrid system include system simplicity and flexibility. Since full engine power has to pass through both generator and motor, the rating requirements for electric machines are high and system is big and heavy. As energy passing through the power train, it undergoes double conversions. Therefore, system efficiency is relatively low. The parallel hybrid system, on the other hand, sends only a portion of the power through electric power path, power ratings for electric machine is comparatively low and the system efficiency is high. Parallel hybrid system requires two independent power paths or power systems, subsequently inquires a higher cost penalty. Parallel hybrid systems are suited for mild hybrid systems.

SUMMARY OF THE INVENTION

The present invention provides a power-split hybrid system and a method of managing and controlling such a system. It combines the advantages of both series and parallel hybrid systems. Said power-split hybrid system is designed to operate in two different power-split modes, each corresponding to a particular power-split configuration. The system is comprised of an engine, a transmission and a control system. The operation of the system is based on power-split principle. The power-splitting is accomplished within the transmission. The transmission contains two local power paths internal to the transmission: a power transmitting path where power is transmitted through gears and shafts and a power variation path where power is regulated by a set of variators. The formation of the variators can by electric or hydraulic. The transmission independently controls it's output speed and torque by regulating the local power flow in the power variation path. The transmission is reconfigurable, offering at lest two power-split modes: an output split mode and a compound split mode. The power-split system can further include energy storage devices such as batteries, capacitors or pressurized hydraulic tanks.

In this description, hybrid electro-mechanic system is chosen as an example, not limitation, to illustrate the power-split hybrid system and its control method. The hybrid electro-mechanic system uses a set of two electric machines as the variators to form the power-variation path. The power variation path can be regarded as a local series electric hybrid subsystem. Since only a portion of the transmitted power goes through this local series hybrid subsystem, the overall system offers higher efficiency. Thus, the power-split hybrid system as a whole overcomes the deficiencies of the series hybrid system. The power-split hybrid system of present invention has other advantages owning to its two mode operation. It has a wider speed ratio range and is less demanding on electric machines in terms of torque and power. This leads to a noticeable reduction in electric machine size. In addition, the power-split hybrid system of present invention is simple to construct and the control method is robust and easy to implement. Engine speed could effectively be regulated through control of electric machines.

The transmission includes at least a power-splitting device, a power output path selecting device, two electric machines and electric drives. The power-splitting device is comprised of a four-shaft compound planetary gear set, having four coaxial shafts. The compound planetary gear set is formed by two simple planetary gear sets where a first planet gear in the first simple planetary set engages a corresponding second planet gear in the second simple planetary gear set to form a planet pair. Said engagement could either be a meshing engagement or a mechanic connection. The planet pairs are support by a common planet carrier. The compound planetary gear set and the electric machines share a common axis of rotation, referred to as the first axis of rotation. The power output path selecting device is comprised of an output shaft, two pairs of gears, and at lest one clutch. The output shaft, the driven gears in two pair of gears and the clutch are co-axially arranged, establishing the second axis of rotation. The power output selecting path device is capable of providing at lest two gear ratios. The values of the said gear ratios are determined by the characteristic parameters of the compound planetary set.

The speed of each shaft in the said four-shaft compound planetary gear set and the relationship between these speeds is represented by a four-branch speed monograph. The speed monograph has a base lever. Four branches are drawn perpendicularly from the lever. Each branch in the speed monograph corresponds to a shaft in the said four-shaft compound planetary set. The branches are numbered consecutively from 1 to 4, staring from one end the base lever to the other end. The shafts of the compound planetary gear set are numbered accordingly. For example, the shaft associated with the first branch of the speed monograph is named as the first shaft; the shaft associated with the second branch is named the second shaft and so on.

Said transmission of present invention includes an input shaft, a four-shaft compound planetary set, two pairs of parallel-shaft gear set and an output shaft. The four-shaft compound planetary gear set has four co-axial rotatable shafts, numbered in the above mentioned convention. The said transmission further includes two electric machines. The configuration of the transmission is characterized as: the two electric machines are in fixed connections with the first shaft and the fourth shaft, respectively; the input shaft is connected to the second shaft; the output shaft is selectively coupled to the first shaft or the third shaft of the compound planetary set through one of the parallel-shaft gear pairs. The above described characteristics, features and benefits as well as preferred embodiments thereof will become more apparent from the reading of the following description in connection with the accompanying drawings.

BRIEF DESCRIPTION OF ACCOMPANYING DRAWING

In the accompanying drawing which form part of the specification:

FIG. 1 is a schematic diagram of the components associated with a hybrid vehicle drive system;

FIG. 2 is a schematic diagram of a preferred embodiment of the electro-mechanical transmission of current invention;

FIG. 3 is a four-branch speed monograph;

FIG. 4 is a power ratio plot of electric power to combined transmission power as a function of output to input speed ratio;

FIG. 5 is a control flow chart of the electric hybrid system;

FIG. 6 is schematic curves showing the relationship between drive torque, acceleration pedal position and vehicle speed;

FIG. 7 is a flow chart used to illustrate the determination process of engine and power-train operating parameters;

FIG. 8 is schematic of constant power curves and constant lines of brake specific fuel consumption of a typical engine used for determining the engine target curve and operating states;

FIG. 9 is a block diagram of control loop for engine speed control;

FIG. 10 is a flow chart describing torque command setting of the electric machines;

FIG. 11 is a schematic diagram of another preferred embodiment of the electro-mechanical transmission of current invention;

FIG. 12 is a schematic diagram of another embodiment of the electro-mechanical transmission of current invention; and FIG. 13 is a schematic diagram of another embodiment of the electromechanical transmission of current invention.

DESCRIPTION OF THE PREFERRED EMBODIMENT

The current invention can have various embodiments and configurations. The following detailed description illustrates the invention by way of example and not by way of limitation. The control method described in followings sections shall not be confined only to the described embodiments, it applies to any configurations and embodiment that incarnates the spirit of current invention.

Refer to FIG. 1, a preferred embodiment of hybrid drive system of current invention comprising a control system and an actuation system. The actuation system includes an internal combustion engine 100, an electro-mechanic transmission 110, a gear train 115, a differential 120, drive shafts 125, drive wheels 110 and battery pack 160. The output shaft of engine operationally couples to the input shaft 105 of the transmission 110. The transmission output shaft 135 couples to differential 120 via gear train 115. In this arrangement, the power of the hybrid drive system is output from transmission 110 through gear train 115, differential 120 and drive shafts 125 to the drive wheels 130. For front drive vehicles, the differential 120, and the gear train 115 are usually integrated into transmission 110, forming a transaxle.

The control system includes vehicle controller 150, also called hybrid system controller, engine control unit (ECU) 140, transmission control unit (TCU) 115, battery control unit (BCU) 165 and braking system control module (BCM) 145. Vehicle controller 150 communicates through controller area networks (CAN) to other control units or modules, including engine control unit 140, transmission control unit 155, battery control unit 165 and brake control module 145. Vehicle controller 150 coordinates and controls operational tasks of the vehicle and its subsystems directly or via the corresponding control units or modules. Vehicle controller can be made in a form of a stand alone unit or be integrated with one or more of its subordinate control units or modules to form an integrated unit. Vehicle controller, and its subordinate control units and control modules may each have one or more micro processor, memory device, data-managing device as well as input and output devices.

Vehicle controller 150 sets engine (100) output power and power state, transmission (110) operating mode and power state, and battery (160) charge or discharge power, based on information and signals received from acceleration pedal 170, brake pedal 180 speed regime selector 190, operation mode selector, vehicles speed sensor and other sensors 200.

Electro-mechanic transmission 110 is the central piece of the hybrid drive system. For the mechanical perspective, the transmission functions to provide optional power and power state matches between the engine and drive wheels; it contains two functional parts, a power-split part designed for splitting and then recombining the transmitted power, an output power path selection part for selecting the power path to deliver the output power. The power split part includes a four-shaft planetary gear train. The four-shaft gear train contains four co-axial rotatable shafts and has two degrees of freedom. The rotational speeds of the four-shaft gear train are uniquely defined, should the speeds of any two shafts be prescribed. The output power path selection part is comprised of at least two pairs of constant meshing gears, two sets of clutches and an output shaft.

Referring to FIG. 2, a schematic diagram of a preferred embodiment of the electro-mechanical transmission for the hybrid drive system of current invention is shown. The transmission is comprised of a power-split device, an output power path selection device and two electric machines (EM1, EM2). Said transmission further includes power electronic circuits and control unit (CTL, not shown). The power-split device includes an input shaft SHFT1 and a modified Ravigneaux planetary gear set (also referred to as compound planetary gear set, PG). Said power-split device has four co-axial rotatable shafts. They are arm-range along with the two electric machines EM1, EM2 on the same axis of the input shaft SHFT1, foiling the first centerline of rotation. The output power path selection device includes two pairs of meshing gears g1 and G1, and g2 and G2, two sets of clutches CL1, CL2 and an output shaft SHFT2. The driven gears g1 and g2 of the two meshing gear sets are arranged on the same axis of the output shaft SHFT2, along with the two clutches, forming the second centerline of rotation.

Each electric machine (EM1 or EM2) includes a rotor (RT1 or RT2), a stator (ST1 or ST2) and associated angular position sensor or speed sensor (not shown). Each electric machine is electrically connected to battery 160 through its respective inverter. In this way, the two electric machines establish an electric connection between them.

The compound planetary gear set PG includes a first ring gear R1, a second ring gear R2, a set of long planet gears PL, a set of short planet gears PS, a planet carrier CR and a sun gear S. The second ring gear R2, the long planet gears PL, the sun gear S and the planet carrier CR form a simple and complete planetary gear set; the first ring gear R1, the short planet gears PS and the planet carrier CR form an incomplete planetary gear set. The long planet gears PL are evenly distributed around the axis of rotation of the planetary gear set and rotate-ably supported by planet carrier CR. Likewise, the short planet gears PS are distributed and supported by the planet carrier CR around the axis of rotation of the planet gear set. Each long planet gear in the long planet gear set PL is in an external meshing engagement with a corresponding short planet gear in the short planet gear set PS. The first ring gear R1 is in internal meshing engagements with each and every short planet gears PS; the second ring gear R2 meshes internally with each and every long planet gears PL. The sun gear S meshes externally with each and every long planet gears PL. The compound planet gear set so constructed has four co-axial rotatable shafts S, R1, CR and R2, forming a four-branch system. A branch represents one or more rotatable shaft element having a corresponding angular velocity. The sun gear S constitutes the first branch of the four-branch system; the first ring gear R1 forms the second branch of the four-branch system; the planet carrier CR forms the third branch and the second ring gear R2 forms the fourth branch. The aforementioned four-branch system can be expressed as $$S-R1-CR-R2$$

The angular speeds of the four branches can be expressed in graphical form by a four-branch speed monograph shown in FIG. 3.

The aforementioned four-branch system is connected to input shaft SHFT1, output shaft SHFT2, and to two electric machines EM1 and EM2, respectively in the following manner. The first electric machine EM1 connects to the first branch of the four-branch system via the sun gear S; the second electric machine EM2 connects to the forth branch through the second ring gear R2; input shaft SHFT1 connects to the third branch by coupling with the planet carrier CR; output shaft SHFT2 selectively connects to the fourth branch along with the second electric machine EM2, or to the second branch either by coupling with the second pair of constant meshing gears G2, g2 through the corresponding clutch CL2 or by coupling with the first pair of constant meshing gears G1, g1 through the corresponding clutch CL1.

When output shaft SHFT2 is selectively connects to the second ring gear R2 through the second pair constant meshing gears G2 and g1, clutch CL2 engages and clutch CL1 disengages. Transmission 110 is configured in the so-called output power-split mode, also referred hereafter as the first operation mode. In the output power-split mode, the second branch to which the first ring gear is connected is in idle state. The four-branch system is regressed to three-branch system, expressed as $$S-CR-R2$$

The connection of said three-branch system with the input and output shafts as well as with two electric machines can simply be expressed as $$S(EM1)-CR(SHFT1)-R2(EM2, SHFT2)$$

where each term in the expression represents a branch of the three-branch system, and is associated with a rotatable shaft in the corresponding three-shaft system gear system. The content in the bracket denotes the component or components to which the branch is connected.

When output shaft SHFT2 is selectively connected to the first ring gear R1 via the first pair of constant meshing gears G1 and g1, clutch CL1 engages and clutch CL2 disengages. In this situation, transmission 110 is configured into the so-call compound power-split mode, referred hereafter to as the second operation mode. Under this operation mode, all four branches in the four-branch system are working together to provide desired power flow within the four-branch system and to deliver required power the output shaft. The connection of the four-branch system with the input and output shafts as well as with two electric machines can be expressed in a short notation as $$S(EM1)-R1(SHFT2)-CR(SHFT1)-R2(EM2)$$

where each term in the expression represents a branch in the four-branch system, and is associated with a rotatable shaft in the corresponding four-shaft system gear system. The content in the bracket denotes the component to which the branch is connected.

The aforementioned planetary system serves as the power splitting device where the input power is divided and directed to various power paths, and then combined at the output shaft. The output power path selecting device determines the operation mode of the transmission by selecting an appropriate connecting configurational of the planetary system with the output shaft SHFT2. Regardless the power-split configurations, a common feature is that there exist at least a mechanic power path and at least an electric power path within the transmission. The electric power path is formed by two electric machines connected in series; the mechanic power path is formed by gears, shafts and other mechanic components. The power state at the output shaft of the transmission and the speed ratio of the output to input shafts are regulated by the power flow ratio of the two power paths. Define the ratio of electric power passing through one of the electric machines to the power delivered from engine to be the electric power ratio, denoted as $P_{E1}/P_{eng}$ or $P_{E2}/P_{eng}$, the ratio of charging or discharging power of battery to engine power as the battery power ratio d=Pbat/Peng. Denote the speed ratio of output shaft SHFT2 to input shaft SHFT1 as SR. Different power-split configurations result in different relationships between electric power ratio, battery power ratio and speed ratio.

Power split system (transmission) shown in FIG. 2 provides three speed node points, known as speed nodes, including a natural speed node where SR=0 and two regular speed nodes where SR≠0. A speed node is also referred to as speed ratio node. At a speed ratio node, at least one of the electric machines has a zero rotational speed. Thus a speed node point is also a zero power node point for at least one of the electric machines. The regular speed ratio nodes, according their ascending order, are named the first speed ratio node SR1, and the second speed ratio node SR2. The natural speed node point divides the entire range of output speed of the transmission into forward and reverse regimes; the first speed ratio node further divides the forward regime into low speed and high speed regimes.

Low Speed Regime

The low speed regime is located between the natural speed node and the first speed node (0<SR<SR1). While vehicle speed in low speed regime is slow, the drive torque demands are often high. Transmission is operated under the output power split mode. The first clutch CL1 is disengaged and the second clutch is engaged. The output power is delivered from the second ring gear and electric machine EM2, through the second pair of constant meshing gears G2 and g2, to the output shaft SHFT2.

Under steady state conditions, assuming no net power received from or delivered to battery, namely d=0, the electric power ratios of the electric machines can be expressed as functions of the speed ratio SR:

$$\left. \begin{array}{l} \dfrac{P_{EM1}}{P_{eng}} = 1 - \dfrac{K}{(1+K)K_{G2}} \cdot SR \\ \dfrac{P_{EM2}}{P_{eng}} = -1 + \dfrac{K}{(1+K)K_{G2}} \cdot SR \end{array} \right\} SR \leq SR_{switch} \quad (1)$$

where K is a characteristic gear ratio of the compound planet gear, known as the first parametric ratio, defined as the teeth ratio of the second ring gear R2 to the sun gear S. $K_{G2}$ is the teeth ratio of the second constant meshing gears G2 and g2.

$$K = \frac{N_{R2}}{N_S};$$

$$K_{G2} = \frac{N_{G2}}{N_{g2}}$$

where $N_{R2}$ is the teeth numbers of the second ring gear R2, $N_S$ is the teeth numbers of sun gear S; $N_{G2}$ is the teeth numbers of the drive gear G2 and $N_{g2}$ is the teeth numbers of the driven gear g2. $SR_{switch}$ is the switching node point where the low speed regime meets with the high speed regime.

From equation (1), the first speed ratio node can be solved, yielding, $$SR1 = \left( \frac{1+K}{K} \right) K_{G2} \quad (2)$$

High Speed Regime

High speed regime covers the speed ratio range where SR>SR1. In this the regime, vehicle speed is high, but drive torque is relatively low. Transmission is operated under compound power split mode. The first clutch CL1 engages and the second clutch disengages. The output power is delivered to the output shaft SHFT2 from the first ring gear R1 via the first pair of constant meshing gear set G1 and g1.

Under steady state conditions, assume no net electric power delivered to or received from battery, namely d=0, the electric power ratios of the electric machines can be expressed as functions of the speed ratio SR as:

$$\left. \begin{array}{l} \dfrac{P_{EM1}}{P_{eng}} = \dfrac{K}{\beta(1+K)K_{G1}} \cdot SR + \dfrac{(1+\beta)(K-\beta)K_{G1}}{\beta(1+K)} \cdot \dfrac{1}{SR} - \dfrac{K(\beta+2)-\beta}{\beta(1+K)} \\ \dfrac{P_{EM2}}{P_{eng}} = -\dfrac{K}{\beta(1+K)K_{G1}} \cdot SR - \dfrac{(1+\beta)(K-\beta)K_{G1}}{\beta(1+K)} \cdot \dfrac{1}{SR} + \dfrac{K(\beta+2)-\beta}{\beta(1+K)} \end{array} \right\} SR \geq SR_{switch} \quad (4)$$

where b is the second parametric ratio of the compound planet gear set, defined as the teeth ratio of the second ring gear to the first ring gear; $K_{G1}$ gear teeth ratio of the first pair of constant meshing gears G1 and g1:

$$\beta = \frac{N_{R2}}{N_{R1}}; \quad (5)$$

$$K_{G1} = \frac{N_{G1}}{N_{g1}}$$

In the above equations, $N_{R1}$ is the teeth numbers of the first ring gear R1 and $N_{R2}$ is the teeth numbers of the second ring gear R2; $N_{G1}$ is the teeth numbers of the drive gear G1 and $N_{g1}$ is the teeth numbers of the driven gear g1 of the first par of constant meshing gears.

From the electric power ratio equation (4), the locations for the first and second speed ratio node points SR1 and SR2 can be solved as $$SR1 = \left(\frac{K-\beta}{K}\right)K_{G1}; \quad SR2 = (1+\beta)K_{G1} \qquad (6)$$

The span between the first speed node point SR1 and second speed node point SR2 represents the effective width of the speed ratio range of the transmission, and is referred to as the speed node span F. It is defined as the ratio of the second speed node SR2 to the first speed node SR1, that is $$\phi = \frac{SR2}{SR1}$$

The speed node span F determines the maximum electric power ratio of electric machines within the region when SR falls between SR1 and SR2. This is the most frequent operation regime for compound power-split mode. The maximum electric power ratios are expressed as functions of F as following:

$$\frac{P_{EM1\_max}}{P_{eng}} = \frac{\left[\sqrt{(1+\delta)\phi} - 1\right]^2}{\phi - 1} \qquad (7)$$

$$\frac{P_{EM2\_max}}{P_{eng}} = -\frac{\left[\sqrt{\phi} - \sqrt{1+\delta}\right]^2}{\phi - 1} \qquad (8)$$

To ensure adequate operation, power ratings of electric machines must be equal to or greater than the product of engine power and the maximum electric power ratios, that is to say, $$|P_{EM1}| \geq \frac{\left[\sqrt{\phi(1+\delta)} - 1\right]^2}{\phi - 1} \cdot P_{eng} \qquad (9)$$

$$|P_{EM2}| \geq \frac{\left[\sqrt{\phi} - \sqrt{1+\delta}\right]^2}{\phi - 1} \cdot P_{eng} \qquad (10)$$

The switching point $SR_{switch}$ where the low speed and high speed regime meets, is selected at or close to the first speed ratio node SR1.

To ensure coincidence of the regular speed node point of the output power-split mode and the first speed node point of the compound power-split mode, thus making it the switching point ($SR_{switch}$=SR1) of the two modes, the gear ratio $K_{G1}$, of the first pair of constant meshing gears and the gear ratio $K_{G2}$ of the second pair of constant meshing gears shall satisfy the following conditions:

$$\frac{K_{G1}}{K_{G2}} = \frac{K+1}{K-\beta} \qquad (11)$$

Under such conditions, the driven gear g1 of the first pair of constant meshing gears will be synchronized with the driven gear g2 of the second pair of constant meshing gears at the switching point $SR_{switch}$. This significantly simplified the mode switching process, making it possible for a smooth and impact free mode shifting process. In this regard, clutches CL1 and CL2 can be non-frictional, positive engagement type, which is simpler in construction.

Let the transmission speed ratio SR be the abscissa and electric power ratio be the ordinate. From electric power ratio equations (1) and (4), one can plot transmission's electric power ratio v.s. speed ratio curves as shown in FIG. 4 under no charge or discharge conditions. The plot also shows the first and second speed node points. At the speed nodes, at least one of the electric machines has a zero electric power ratio, and accordingly, the electric machine is at zero power condition.

Reverse

In reverse, the vehicle can adopt to the same operation mode, using output power-split mode as it does in the forward slow-speed operating regime. However, to constraint the electric power ratio in the electric power path, avoiding internal power circulation, the vehicle may adopt to a pure electric drive mode.

Parking and Neutral

The embodiment of current invention shown in FIG. 2 is capable of providing other operations, including neutral and parking. Neutral operation is achieved when the two clutches CL1 and CL2 are disengaged. Parking is achieved by a positive engagement clutch or a parking brake on the output shaft SHFT2 (not shown).

Engine Start

In addition, electric machines in the transmission can be used to start engine. Engine ignition is achieved either by the first electric machine EM1, or by collaborative operation of two electric machines EM1 and EM2.

Parallel Hybrid Electric Drive Operation

When the two clutches CL1 and CL2 engage at the same time, the transmission provides a fixed output to input speed ratio, acting as a conventional mechanical transmission. Under such conditions, the transmission may offer a parallel hybrid electric operation mode.

It can be appreciated that the hybrid drive system of current invention is able to provide multiple operating functions including hybrid electric operation, pure electric drive operation and pure mechanical power transmission. During hybrid electric operation, the electric power transmission between the two electric machines needs not to be equal. One electric machine may generate or consume more electric power that the other electric machine can consumes or generates. The net electric power is balanced by charging or discharging batteries. In this way, the two electric machines work in concert to regulate the transmission's speed ratio and to control transmission's output power.

FIG. 5 shows the control flow chart for the hybrid electric drive system of current invention. It includes a number of key steps. During operation, the control system executes repeatedly at a predetermined interval these steps to ensure engine and transmission work at the desired status or set points. These key steps may further contain sub-tasks. The execution of these key steps and sub tasks may be achieved in one or multiple control unit, control module or controllers in conjunction with the associated actuators or mechanisms.

At the beginning a control cycle, the hybrid system controller executes the first step S1000, accepting signals from relevant sensors and transducers, including speed regime selecting signal, drive mode signal, vehicle speed signal ($V_{vch}$, or drive shaft speed $w_{vch}$), acceleration pedal position signal $PPS_{acc}$ and brake pedal position signal $PPS_{brk}$. The received signals are converted and processed to yield required information which forms the basis for subsequent decision making and system control.

The second step S2000 is to determine vehicle drive torque $T_{vch}$ and drive power $P_{vch}$, based on information obtained in the first step. Vehicle drive torque $T_{vch}$ can be determined through functions or lookup tables that define the relationship between drive torque $T_{vch}$, vehicle speed $V_{vch}$, acceleration pedal position $PPS_{acc}$ and brake pedal position $PPS_{brk}$, as shown in FIG. 6. Drive power is obtained as the product of drive torque and drive shaft speed. In function form, vehicle drive torque is expressed as $$T_{vch} = C_{acc} \cdot PPS_{acc} - C_{brk} \cdot PPS_{brk} - C_{cst} \quad (12)$$

where $C_{acc}$, $C_{brk}$ and $C_{cst}$ are parameters. $C_{acc}$ is determined by the maximum allowable drive torque. $C_{acc}$ is a constant when vehicle is at low speed and a variable, decreasing with vehicle speed, when vehicle is at high speed. This is due to that fact that the maximum available drive torque is bounded by the maximum system power, the maximum drive torque decreases as vehicle speed increases. $C_{brk}$ is determined by the peak braking torque. $C_{cst}$ is a constant or a variable as a function of vehicle speed. The drive power is expressed as, $$P_{veh} = T_{veh} \cdot \frac{V_{veh}}{R_w} \quad (13)$$

where $R_w$ is the effective radius of the drive wheels. When drive power assumes negative value, the vehicle slows down. The entire drive power or a portion of the drive power is recaptured through electric machine's regeneration braking process and is sent back to the battery. In the second step S2000, the total power requirement of the vehicle system $P_{sys}$ is computed. The total vehicle power includes drive power $P_{vch}$, mechanical power take off and other non-mechanical power requirements such as air conditioning, lighting and instrumentation. Power losses are included in computing total system power requirement.

The third step S3000 in the control flow chart is to allocate system power resources and set operating points and parameters for the power-train system and its sub-systems or modules and for other auxiliary systems that the vehicle may have. The hybrid control system allocates and rationalizes engine and battery powers based the total system power requirement $P_{sys}$ and current operation status of system and it subsystems, setting appropriate operating parameters such that the vehicle system is working under desired operation conditions. The objective of the desired operation conditions is either to minimize fuel consumption, to minimize emissions, to achieve the best acceleration or to obtain a weighted optimization of the mentioned objectives. In this step, hybrid system controller sends working command signals to its subordinate controllers or control units, such as engine control unit ECU, transmission control unit TCU, battery control unit BCU and brake control module BCM, and to its associated actuators. The working commands include but not limited to fuel injection on and off signals, engine on or off signal, engine speed signal $w_{eng\_set}$, engine torque set point $T_{eng\_set}$, transmission output torque $T_{trans\_req}$ and vehicle braking torque $T_{brk\_set}$.

The energy storage device (battery), under supervision of its control unit, receives or delivers appropriate amount power set forth in Step S3000 through charging or discharging process. The battery control unit keeps track of charging and discharging current, voltage, battery temperature, state of charge, efficiency and other operation parameters. This information is fed to hybrid system controller and used in conjunction with other information for decision making. In addition, the battery control unit monitors and restricts the maximum allowable power and maximum bus voltage to ensure a safe and reliable battery operation.

The fourth step S4000 in the control flow chalk is to set torque commands for the electric machines. Based on information and parameters provided in previous steps, hybrid system controller, in conjunction with transmission control unit and electric drives of the electric machine, determines transmission operation mode and clutch engagement status, and sets torque commands for electric machines. The hybrid system controller, in conjunction with its subordinate control units further controls the operating torque of electric machines in order to regulate engine speed.

In addition, the hybrid control system verifies the command values, making adjustments if necessary to ensure all parameters are within their safe and allowable operation ranges and the system operates smoothly.

The last step S5000 in control flow chart is to monitor and control engine and electric machines' operation. This task is achieved through a coordinated effort between the transmission control unit TCU, the electric drives of the electric machines and engine control unit ECU. Operation parameters generated in previous steps are fully utilized. In addition, the system controller monitors the power and operation status of energy storage device, and the execution of brake system.

Said third step S3000 contains a host of sub-tasks, including operation mode selection, engine power and power state settings. Step S3000 is broken-down into a series of sub-tasks shown in FIG. 7.

In sub-task S3100, sensor signals and operation parameters that reflect vehicle system operation status are read in. These signals and parameters include vehicle speed, total system power requirement, current drive mode, engine on or off time, engine temperature, battery state-of-charge, battery charge or discharge current, voltage and power, and efficiencies of battery and electric machines.

Sub-task S3200 determines vehicle system drive mode. Based on vehicle speed $V_{vch}$, vehicle system power requirement $P_{sys}$, battery state-of-charge SOC, the hybrid system controller determines vehicle system drive mode as well as engine operating points using the pre-programmed control strategy. When vehicle speed or drive power is lower than the predetermined threshold, system controller will utilize one of the following drive modes to enhance fuel efficiency and reduce harmful emissions:

1. Shutting engine off and adopting pure electric drive mode, when SOC is greater than the lower threshold $SOC_{LL}$
2. Turning engine on and using it as the primary power source, adopting electric hybrid drive mode, when SOC is less than the lower threshold $SOC_{LL}$ Sub-task S3300 determines engine output power. Hybrid system controller allocates and rationalizes all available power sources on board based on total system power request $P_{sys}$, the current operating status and efficiencies of power-train system and its subsystems, and the allowable ranges of system and subsystem parameters. This process, in a sense, is an optimization process for system efficiency index $h_{sys}$. The objective is to select an engine output power level that yields a maximum efficiency index under given operation conditions and for requested total system power. That is, $$\text{Max } \eta_{sys} = \eta_{sys}(\theta_{eng}, \mu_{elc}, P_{sys}, P_{eng}) \quad (14)$$

System efficiency index $h_{sys}$ is a function engine efficiency $h_{eng}$, electric machine efficiency, electric drive efficiency, battery state-of-charge SOC, battery charge and discharge power, engine output power, and total system power $P_{sys}$. It reflexes the overall system efficiency under constraints imposed by battery state-of-charge, battery charge and discharge voltage and current limits.

$$\eta_{sys} = \begin{cases} 1 - (1+\alpha_m)\left(\dfrac{1}{\eta_{eng}} - 1\right)\dfrac{P_{eng}}{P_{sys}} - \\ (1+\alpha_E)\left(\dfrac{1}{\mu_{elc}} - 1\right)\left(1 - \dfrac{P_{eng}}{P_{sys}}\right); (P_{eng} \le P_{sys}) \\ 1 - (1+\alpha_m)\left(\dfrac{1}{\eta_{eng}} - 1\right)\dfrac{P_{eng}}{P_{sys}} + \\ (1+\alpha_E)(1-\mu_{elc})\left(1 - \dfrac{P_{eng}}{P_{sys}}\right); (P_{eng} \ge P_{sys}) \end{cases} \quad (15)$$

where $a_m$, $a_E$ are converting coefficients of power losses for mechanical power path and electric power path, respectively. $m_{elc}$ represents the effective efficiency of the electric system, and is a function of battery efficiency $h_{bat}$, electric drive efficiency $h_{inv}$, battery state-of-charge SOC, and battery charge or discharge power $P_{bat}$. The constraints for certain parameters, such as SOC, can be expressed as penalty functions or penalty factors and be incorporated in said effective efficiency. Therefore, the constraints are automatically enforced during the optimization process for the efficiency index.

$$\mu_{elc} = \mu_{elc}(\eta_{bat}, \eta_{inv}, SOC, P_{bat}) \quad (16)$$

To speed up execution, optimization results are often obtained offline and loaded into memory devices as lookup tables. During operation, these results are read directly from the lookup tables.

Sub-task S3400 sets the engine operating points based on the set engine output power. An engine operating point is defined by a combination of engine speed and torque ($w_{eng}$, $T_{eng}$), which represents an engine power state (FIG. 8), denoted by $P_{eng}(w_{eng}, T_{eng})$.

Different engine power states lead to different brake specific fuel consumptions, even under an identical power level.

The task of setting engine operating point is to select an engine speed and torque combination, under given request engine power level, such that engine yields the lowest brake specific fuel consumption, the lowest emissions or the best combination of fuel consumption and emissions. FIG. 8 shows a contour plot of engine fuel consumption under various operating points or power states. The thin solid lines are isolines of fuel consumption; the thin dash lines are isolines of engine power; the thick solid line represents the target engine operation line, which is a collection of desired engine operation points. The solid dash line represents engine torque limit as a function of engine speed. When the objective of target engine operation line is to minimize engine fuel consumption, the intersection ($P_m$) of target engine operation line with each isoline of engine power shall be at a point ($l_m$) along the power isoline where the fuel consumption is at its lowest value for this power level. The target engine operation line can be stored in the memory device of the system controller in a form of lookup table where engine power is the independent variable, and engine speed and torque are dependent variables. During execution of control algorithm, the controller reads out directly or through interpolating the targeted engine speed and torque based on request engine power.

Once engine power state is set, hybrid system controller instructs its subordinate control units or control modules to execute corresponding control programs or algorithms to control engine torque and speed, ensuring that engine is operated at the set power state. Engine speed is controlled through regulating the operating torque of electric machines. Detailed control process is described in sub-tasks S4100 to S4500. Engine torque is controlled by engine control unit ECU through adjusting throttle position, air-fuel ratio, intake and exhaust valve opening and phasing, injection duration, spark timing and other influential means.

Sub task S3500 sets output torque of the transmission and the braking effort or brake torque of the brake system. Transmission output torque is determined by vehicle drive torque demand, gear ratio, drive line efficiency, and constraints of physical components and systems. Braking effort or braking torque is determined on the basis of total system braking effort or brake torque demand, the maximum available regenerative brake capacity and vehicle speed. Brake control module BCM generates command signals based on the set brake torque value, and sends said signals to corresponding brake actuators. Brake control module monitors brake torque at each wheel.

Engine speed control is achieved by controlling the operating torque of the electric machines. In this regard, engine, electric machines, gear and shaft system along with speed sensors and drive systems of said electric machines form a closed control loop. FIG. 9 shows the block diagram of this control loop, comprising a feed forward part and a feed back part. Operating torque of electric machines is calculated and set by transmission control unit TCU. The flow chart for setting the operating torque of electric machines is shown FIG. 10, which is comprised of sub-tasks S4100 to S4500.

In sub-task S4100, vehicle system status parameters, including engine speed reference value $w_{eng\_set}$, and actual value $w_{eng}$, engine torque reference value $T_{eng\_set}$ or estimated value $T_{eng\_est}$ (both are referred to as engine reference torque, denoted as $T_{eng\_set}$) and request value of transmission output torque, are obtained as input variables.

Sub-task S4200 calculates Output to input speed ratio of the transmission based on engine speed and transmission output shaft speed, and determines the suitable operation mode of the transmission and the associated clutch engagement status. In addition, sub task S4200 generates clutch command signals.

Sub-task S4300 calculates the steady state torque $TB_{EM1}$, $TB_{EM2}$ of electric machines based on engine reference torque $T_{eng\_set}$ and transmission output torque request $T_{trans\_req}$, providing feed forward information to transmission controller. The steady state torque of electric machine is also referred to as the base torque or feed forward torque of the electric machines.

$$\begin{bmatrix} TB_{EM1} \\ TB_{EM2} \end{bmatrix} = \begin{bmatrix} CK_{11} & CK_{12} \\ CK_{21} & CK_{22} \end{bmatrix} \cdot \begin{bmatrix} T_{eng\_set} \\ T_{trans\_req} \end{bmatrix} \quad (17)$$

where $CK_{11}$, $CK_{12}$, $CK_{21}$, and $CK_{22}$ are torque converting constants. They are determined by configurations of planet gear set as well as the characteristic parameters of gear train K, b, $K_{G1}$, $K_{G2}$. In addition, torque converting constant $CK_{12}$ is determined by operation mode of the transmission. For embodiment shown in FIG. 2, when transmission is in output power-split mode (the first operation mode), $$CK_{11} = \frac{1}{1+K}; CK_{12} = 0; \quad (18)$$
$$CK_{21} = \frac{K}{1+K}; CK_{22} = K_{G2}$$

When transmission is in compound power split mode (the second operation mode), $$CK_{11} = \frac{1}{1+K}; \quad CK_{12} = \left(\frac{1+\beta}{1+K}\right)K_{G1}; \quad (19)$$

$$CK_{21} = \frac{K}{1+K}; \quad CK_{22} = K_{G2}$$

For embodiment of transmission shown in FIG. 2, at the operation mode switching point, the corresponding components to be connected by the irrelevant clutch are synchronized with the output shaft. Therefore, there is no speed jump anywhere in the transmission. It can be further noted from equations (17) to (19), that at the switching point, the base torque of the second electric machine EM2 is also continuous, resulting in no shock loads.

Sub-task S4400 compares engine speed $w_{eng}$ measured by a speed sensor with the engine reference speed $w_{eng\_set}$, and generates differential speed signal $Dw_{eng}$. Engine differential speed is also referred to as engine speed error. Using differential speed in conjunction appropriate control law, torque adjustments $TF_{EM1}$, $TF_{EM2}$ can be generated. The torque adjustments are also referred to as the feed back torque or dynamic torque.

$$\begin{bmatrix} TF_{EM1} \\ TF_{EM2} \end{bmatrix} = \begin{bmatrix} f_1(\Delta\omega_{eng}) \\ f_2(\Delta\omega_{eng}) \end{bmatrix} \quad (20)$$

where $f_j(Dw_{eng})$ (j=1,2) are feed back functions of differential speed $Dw_{eng}$; the subscript j=1,2 refers to different feedback functions. Differential speed feed back functions can be expressed in a unified form as $$f_j(\Delta\omega_{eng}) = G_{Pj} \cdot \Delta\omega_{eng} + G_{Ij} \cdot \int \Delta\omega_{eng} dt + G_{Dj} \cdot \frac{d(\Delta\omega_{eng})}{dt}, \quad (21)$$

$$(j = 1, 2)$$

$$\Delta\omega_{eng} = \omega_{eng\_set} - \omega_{eng} \quad (22)$$

where $G_{Pj}$, $G_{Ij}$, and $G_{Dj}$ (j=1,2) are proportional, integral and differential gains, whose values may vary with operation modes.

Sub task S4500 calculates the total torque or the operating torque of the electric machines. Said operating torque of electric machines is the summation of steady state torque and the dynamic torque:

$$\begin{bmatrix} T_{EM1} \\ T_{EM2} \end{bmatrix} = \begin{bmatrix} TB_{EM1} \\ TB_{EM2} \end{bmatrix} + \begin{bmatrix} TF_{EM1} \\ TF_{EM2} \end{bmatrix} \quad (23)$$

Operating torque command signals are sent to the electric drives of the corresponding electric machines by the transmission control unit. The electric drives regulate operating torque of the electric machines.

As can be appreciated, engine speed control is achieved though collaborative torque control of the two electric machines. The operating torque of electric machines is comprised of base torque ($TB_{EM1}$, $TB_{EM2}$) and feed back torque ($TF_{EM1}$, $TF_{EM2}$). The base torque ($TB_{EM1}$, $TB_{EM2}$) is a linear combination of engine reference torque $T_{eng\_set}$ and transmission output torque request $T_{trans\_req}$. The proportional constants in this linear combination are determined by the characteristic parameters of the planet gear set and the output gear train. One of the proportional constants is also dependent upon operation mode of the transmission. The feed back torque ($TF_{EM1}$, $TF_{EM2}$) is determined by feed back functions of engine speed error.

Torque control for electric machines is implemented by electric drives consisting controllers and power electronic inverters. Torque control is accomplished in steps S5000B and S5000C. Control system executes repeatedly these steps at a pre-determined time interval. The detailed control method or algorithm for electric machine torque may vary with the construction of electric drives as well as the design of electric machines. For synchronous permanent magnet electric machines, torque control is achieved through voltage control by means of pulse width modulation (PWM) via a vector controller.

So far, we have described hybrid vehicle system shown in FIG. 1 and its control method, using the power split system shown in FIG. 2 as a preferred transmission embodiment. In fact, there are other transmission embodiments which the described hybrid vehicle system can make use of and the described control metrology is applicable to. FIG. 11 shows a second embodiment of the transmission which offers identical functionality but with different configuration. Likewise, the transmission is comprised of a power-split device, an output power path selection device and two electric machines (EM1, EM2) along with their electric drives. The power-split device is comprised of a four-branch compound planetary gear system and an input shaft SHFT1. The compound planetary gear system is further comprised of a complete simple planetary gear set PG2, and an incomplete simple planetary gear set PG1, where the complete planetary gear set consists a sun gear S, a set of long planet gears PL, a ring gear R2 and a planet carrier CR; the incomplete planetary gear set contains a set of short planet gears PS, a ring gear R1, and planet carrier CR. Each and every long planet gear PL in the complete planetary gear set PG2 engages externally a corresponding short planet gear PS in the incomplete planetary gear set PG1, forming a pair of engaging planet gears. Each and every planet gear pairs are supported on planet carrier CR. The output power path selection device is comprised of two pairs of constant meshing gears G1, g1 and G2, g2, two clutches CL1, CL2 and an output shaft SHFT2.

The second transmission embodiment, shown in FIG. 11, is capable of providing an output power-split mode and a compound power-split mode depending on the engagement status of the two clutches CL1 and CL2.

When the first clutch CL1 disengages and the second clutch CL2 engages, the transmission operates under the output power-split mode. System power is sent to the output shaft SHFT2 through the second pair of the constant meshing gears G2 and g2. Accordingly, the branches of the compound planetary gear set assume the following connections with the input shaft SHFT1, the output shaft SHFT2, and the two electric machines EM1, EM2:

S(EM1,SHFT2)–R1(SHFT1)–R2(EM2)

When the first clutch CL1 engages and the second clutch CL2 disengages, the transmission operates under the compound power-split mode. System power is sent to the output shaft SHFT2 through the first pair of constant meshing gears G1 and g1. Accordingly, the four branches of the compound planetary gear set assume the following connections with the input shaft SHFT1, the output shaft SHFT2, and the two electric machines EM1, EM2:

S(EM1)–R1(SHFT1)–CR(SHFT2)–R2(EM2)

The previously described control strategy and control methodology are equally applicable to the hybrid vehicle system with transmission embodiment shown in FIG. 11.

FIG. 12 shows the third embodiment of the hybrid transmission. Similarly, the transmission is comprised of a power-split device, an output power path selection device and two electric machines along with their electric drive systems. The power split device includes an input shaft SHFT1, and a four-branch compound planetary gear system. Said compound planetary gear system is comprised of a complete simple planetary gear set PG1 and an incomplete simple planetary gear set PG2. The complete planetary rear set contains a sun gear S1, a set of long planet gears PL, a ring gear R and a planet carrier CR; the incomplete planetary gear set P62 contains a sun gear S2 and a set of short planet gears PS and shares the same planet carrier CR with the complete planetary gear set. Every long planet gear PL in the complete planetary gear set engages externally with a corresponding short planet gear PS in the incomplete planetary gear set, forming a pair of planet gears. All pairs of planet gears are supported on the planet carrier CR. The output power path selection device includes two pairs of constant mashing gears G1, g1 and G2, g2, two clutches CL1 and CL2, and an output shaft SHFT2.

The third embodiment of transmission shown in FIG. 12 is capable of providing two power-split modes: the output power-split mode and the compound power-split mode, depending on engagement status of the two clutches CL1 and CL2.

When the first clutch CL1 disengages and the second clutch CL2 engages, the transmission operates under the output power-split mode. System power is sent to the output shaft SHFT2 though the power splitting device and the second pair of constant meshing gears G2 and g2. The connections between the compound planetary gear and the input shaft SHFT1, output shaft SHFT2 as well as electric machines EM1, EM2 can be expressed as following:

$$S1(EM1,SHFT2)-CR(SHFT1)-S2(EM2)$$

When the first clutch CL1 engages and the second clutch CL2 disengages, the transmission operates under the compound power-split mode. System power is sent to the output shaft SHFT2 though the power split device and the first pair of constant meshing gears G1 and g1. The connections between the compound planetary gear and the input shaft SHFT1, Output shaft SHFT2 as well as electric machines EM1, EM2 can be expressed as following:

$$S1(EM1)-CR(SHFT1)-R(SHFT2)-S2(EM2)$$

Similarly, the previously described control strategy and control methodology are equally applicable to the hybrid vehicle system with transmission embodiment shown in FIG. 12.

Refer to FIG. 13, the fourth embodiment of the transmission, which is derived from the third embodiment with only minor changes. The transmission is comprised of a power split device, an output power path selection device and two electric machines EM1, EM2 along with their electric drive systems. The said power-split device includes an input shaft SHFT1 and a four-branch compound planetary gear set. The compound planetary (year set is further comprised of a complete simple planetary gear set PG1 and an incomplete simple planetary gear set PG2, where the complete planetary gear set PG1 includes a sun gear S1, a set of long planet gears PL, a ring gear R and a planet carrier CR; the incomplete planetary gear set PG2 includes a sun gear S2, a set of short planet gears PS and the shared planet carrier CR. Every long planet gear PL in the complete planetary gear set PCI engages externally with a corresponding short planet gear PS in the in complete planetary gear set PG2, forming a planet gear pair. The planet gear pairs are supported by planet carrier CR. The output power path selection device is comprised of two pairs of constant meshing gears G1, g1 and G2, g2, two clutches CL1, CL2 and an output shaft SHFT2.

The fourth embodiment of transmission shown in FIG. 13 is capable of providing two power-split modes: the output power-split mode and the compound power-split mode, depending on engagement status of the two clutches CL1 and CL2.

When the first clutch CL1 disengages and the second clutch CL2 engages, the transmission operates under the output power-split mode. System power is sent to the output shaft SHFT2 though the power split device and the second pair-constant meshing gears G2 and g2. The connections between the compound planetary gear and the input shaft SHFT1, output shaft SHFT2 as well as electric machines EM1, EM2 can be expressed as following:

$$S1(EM1)-R(SHFT1)-S2(EM2, SHFT2)$$

When the first clutch CL1 engages and the second clutch CL2 disengages, the transmission operates under the compound power-split mode. System power is sent to the output shaft SHFT2 though the power split device and the first pair of constant meshing gears G1 and g1. The connections between the compound planetary gear and the input shaft SHFT1, output shaft SHFT2 as well as electric machines EM1, EM2 can be expressed as following:

$$S1(EM1)-CR(SHFT2)-R(SHFT1)-S2(EM2)$$

The control strategy and control methodology described in this specification applies equally as well to the fourth embodiment shown in FIG. 13.

In summary, a common feature for various transmission embodiments is that they all are comprised of a power-split device, an output power path selection device and two electric machines. The said power-split device includes a compound planetary gear system. The compound planetary gear system is further comprised of two simple planetary gear sets where a planet gear in one simple planetary gear set forms a planet gear pair with a corresponding planet gear in the other simple planetary gear set. The two simple planetary gear sets share a common planet carrier, which supports the planet gear pairs. The rotation shafts in the power-split device and the two electric machines have a common axis of rotation, referred to as the first axis of rotation. The output power path selecting device is comprised of a simple parallel shaft gear system having an output shaft, two pairs of constant meshing gears and two clutches. The output shaft, the driven gears of the constant meshing gear pairs and the clutches share another axis of rotation, referred to as the second axis of rotation. The output power path selection device is able to offer two gear ratios. The ratio of the two gear ratios is dependent only upon the characteristic parameters of the compound planetary gear system. The control strategy and control methodology disclosed in this invention apply to all hybrid vehicles systems using the described transmission embodiments or transmissions alike.

It can be appreciated, the control strategy and methodology described in this invention has a broad applicability. It is applicable in its entirety or in portion to hybrid vehicle system that includes an engine and a power split transmission based on various types of power split configurations including output power-split, compound power split or selective output power-split and compound power-split configurations.

It needs to be pointed out that in various transmission embodiments described previously, electric machines can be directly coupled to the first or the fourth branch of the compound planetary gear system, as shown in embodiments described, or indirectly coupled to the first or the fourth branch through intermediate gears or reduction gears to adjust electric machines' operation range or to meet structural arrangement requirement.

In view of the above, it can be seen that the several objects of the invention are achieved and other advantageous results are obtained. As various changes or modifications could be made in the above constructions without departing from the scope of the invention, it is intended that all matter contained in the above description or shown in the accompanying drawings shall be interpreted as illustrative and not a limiting sense.

The invention claimed is:

1. A hybrid system for regulating the delivery of power to a drive shaft and providing at least two power-split modes, said hybrid system comprising:
   an engine;
   a transmission; and
   a hybrid control system capable of computing and setting power requirement for said hybrid system, allocating power resources for said hybrid system and setting engine operating power state;
   said transmission comprising:
      a power splitting device; and
      an output power path selecting device capable of providing at least two speed ratios;
      said power splitting device having:
         an input shaft operatively coupled with said engine;
         a compound planetary gear system having a fixed configuration and a fixed set of coaxially rotatable members, each of said coaxially rotatable members being capable of rotating at a different speed, the compound planetary gear system has kinematic characteristics that are uniquely defined by two characteristic parameters;
         said compound planetary gear system consisting essentially of:
      a first planetary gear set is a complete simple planetary gear set consisting of three coaxially rotatable members; and
      a second planetary gear set is an incomplete planetary gear set consisting of two coaxially rotatable members;
      said first and second planetary gear sets sharing a common member;
      a member of said first planetary gear set being jointed with a member of said second planetary gear set to form said common member;
      said compound planetary gear system formed by said first and second planetary gear sets constituting a four-shaft compound planetary gear system having a first, a second, a third and a fourth coaxial rotatable members that corresponds respectively to a first, a second, a third and a fourth branch of a four-branch speed monograph
      said output power path selecting device including:
         an output shaft operatively coupled with drive shaft;
         a first pair of constant meshing gears having a first drive gear and a first driven gear, the teeth ratio of the first drive and driven gears defining the first speed ratio;
         a second pair of constant meshing gears having a second drive gear and a second driven gear, the teeth ratio of said second dive and driven gears defining the second speed ratio;
         a first clutch;
         a second clutch;
         said output shaft being selectively connected through at least one of said, clutches to two different coaxially rotatable members of said compound planetary gear system respectively with different speed ratios,
         the ratio of said two speed ratios being a function of said characteristic parameters of said compound planetary gear system.

2. The hybrid system according to claim 1, wherein:
said transmission further comprises:
   a first electric machine; and
   a second electric machine;
   said first electric machine being operatively connected to the first member of the compound planetary gear system;
   said second electric machine being operatively connected to the fourth member of the compound planetary gear system;
   said input shaft of power split device being operatively connected to the second member of the compound planetary gear system; and
   said output shaft of the output power path selection device being selectively coupled either to the first or to the third member of the compound planetary gear system through one of the two constant meshing gear pairs and by engaging one of the two clutches.

3. The hybrid system according to claim 2, wherein:
said first member of the compound planetary gear system is the sun gear of the first planetary gear set,
said second member of the compound planetary gear system is the ring gear of the second planetary gear set,
said third member of the compound planetary gear system is the planetary carrier for both the first and second planetary gear sets, and
said fourth member of the compound planetary gear system is the ring gear of the first planetary gear set.

4. The hybrid system according to claim 2, wherein:
said first member of the compound planetary gear system is the ring gear of the first planetary gear set,
said second member of the compound planetary gear system is the planetary carrier of both the first and second planetary gear sets,
said third member of the compound planetary gear system is the ring gear of the second planetary gear set, and
said fourth member of the compound planetary gear system is the sun gear of the first planetary gear set.

5. The hybrid system according to claim 2, wherein:
said first member of the compound planetary gear system is the sun gear of the first planetary gear set,
said second member of the compound planetary gear system is the planetary carrier of both the first and second planetary gear sets,
said third member of the compound planetary gear system is the ring gear of the first planetary gear set, and
said fourth member of the compound planetary gear system is the sun gear of the second planetary gear set.

6. The hybrid system according to claim 2, wherein:
said first member of the compound planetary gear system is the sun gear of the second planetary gear set,
said second member of the compound planetary gear system is the ring gear of the first planetary gear set, said third member of the compound planetary gear system is the planetary carrier of both the first and second planetary gear sets, and said fourth member of the compound planetary gear system is the sun gear of the first planetary gear set.

7. The hybrid system according to claim 2, wherein the power ratings for said first and second electric machines are no less than the products of the maximum electric power ratios and engine power $P_{eng}$ as set forth by the following equations:

$$|P_{EM1}| \geq \frac{\left[\sqrt{\phi(1+\delta)} - 1\right]^2}{\phi - 1} \cdot P_{eng}$$

$$|P_{EM2}| \geq \frac{\left[\sqrt{\phi} - \sqrt{1+\delta}\right]^2}{\phi - 1} \cdot P_{eng}$$

where $$\phi = \frac{SR2}{SR1}; \quad \delta = \frac{P_{bat}}{P_{eng}};$$

SR1, SR2 are the first and second speed ratio node points, respectively;

$P_{bat}$ is battery power;

$P_{eng}$ is the engine power.

8. The hybrid system according to claim 1, wherein said first planetary gear set has a first set of planet gears, and said second planetary gear set has a second set of planet gears, each of the planet gears in said first planetary gear set mechanically connects with a corresponding planet gear in said second planetary gear set to form a planet pair, and wherein said common member is the planet carrier member for both the first and second planetary gear sets, said common member supports and rotates at a same orbiting speed as said planet pairs.

9. The hybrid system according to claim 1, wherein said common member is the planet carrier member for both the first planet gear set and the second planet gear set, each and every planet gear in the first planetary gear set engages with a corresponding planet gear in the second planetary gear set forming a planet pair; said planet pairs being supported on the common planet carrier member; said compound planetary gear system being configured to assume at least one of the following connections with said first and second electric machines (EM1, EM2), said input shaft (SHFT1) and said output shaft (SHFT2):

S(EM1)–CR(SHFT1)–R2(EM2, SHFT2),

S(EM1)–R1(SHFT2)–CR(SHFT1)–R2(EM2),

S(EM1,SHFT2)–R1(SHFT1)–R2(EM2),

S(EM1)–R1(SHFT1)–CR(SHFT2)–R2(EM2),

S1(EM1,SHFT2)–CR(SHFT1)–S2(EM2),

S1(EM1)–CR(SHFT1)–R(SHFT2)–S2(EM2),

S1(EM1)–R(SHFT1)–S2(EM2,SHFT2) or

S1(EM1)–CR(SHFT2)–R(SHFT1)–S2(EM2)

where each expression contains multiple terms and represents a multi-branch speed monograph, said terms are linked by hyphens that resemble the base lever of the multi-branch speed monograph, each term represents a branch of the multi-branch speed monograph, said terms are linked in the same order as their corresponding branches are arranged in the multi-branch speed monograph, the first term represents the first branch, the second term represents the second branch and so on, each term is named by a symbol or a combination of symbols that denotes a co-axially rotatable member of a compound planetary gear system, said co-axially rotatable member is thus associated with the said term and its corresponding branch in the multi-branch speed monograph, in above expressions, S1 and S2 denote the sun gear members in the first planetary gear set and the second planetary gear set, respectively; S denotes the sun gear member should it be the only sun gear in the planetary gear system, CR denotes the common planet carrier member, R1 and R2 denote the ring gear members in the first and second planetary gear set, respectively, R denotes the ring gear member should it be the only ring gear in the planetary gear system, each term is followed by a bracket which implies that the associated coaxially rotatable member is connected directly or indirectly through gears to the content or contents in the bracket, in the brackets of above expressions, EM1 and EM2 denote respectively the first and second electric machine; SHFT1 denotes the input shaft; SHFT2 denotes the output shaft.

10. The hybrid system according to claim 1, wherein said first clutch and second clutch are positive engagement type; said first and second clutches being integrated as a unit.

11. The hybrid system according to claim 1, wherein the rotation center of said compound planetary gear system of the power splitting device defines a first axis of rotation and the rotation center of said output shaft of the output power selecting device defines a second axis of rotation; the first axis of rotation and the second axis of rotation being parallel.

12. A method for controlling operation of the hybrid system of claim 1, said method comprising:

a step and means for receiving and processing input data and information, including vehicle speed, and acceleration pedal position;

a step and means for determining drive torque and total system power;

a step and means for allocating available power resources of said hybrid system and for setting engine output power sate, transmission operating mode and transmission operating parameters;

a step and means for determining electric machine torque commands; said means including use of different equations for torque calculations based on operating modes;

a step and means for controlling engine speed and operating torque of both the first and second electric machines.

13. The method for controlling operation of a hybrid system according to claim 12 wherein said electric machine torque is comprised of a feed forward component, also known as the base torque, and a feedback component, known as the adjustment torque; said base torque being a linear combination of transmission output torque request and engine reference torque; the coefficients for the combination being functions of the characteristic parameters of the compound planetary gear system and the gear ratio of the constant meshing gear pairs; one of the coefficients being further dependent on operation mode of the transmission; said adjustment torque being functions of engine speed error.

14. The method for controlling operation of a hybrid system according to claim 12 wherein said means for allocating available power resources of hybrid system includes determination of engine output power and battery power based on an optimization algorithm or on a look-up table pre-determined using an optimization algorithm.

15. The method for controlling operation of a hybrid system according to claim 14 wherein the engine output power is determined by conditional maximization of overall system efficiency index $h_{sys}$ $$\eta_{sys} = \begin{cases} 1 - (1+\alpha_m)\left(\dfrac{1}{\eta_{eng}} - 1\right)\dfrac{P_{eng}}{P_{sys}} - \\ (1+\alpha_E)\left(\dfrac{1}{\mu_{elc}} - 1\right)\left(1 - \dfrac{P_{eng}}{P_{sys}}\right); (P_{eng} \leq P_{sys}) \\ 1 - (1+\alpha_m)\left(\dfrac{1}{\eta_{eng}} - 1\right)\dfrac{P_{eng}}{P_{sys}} + \\ (1+\alpha_E)(1-\mu_{elc})\left(1 - \dfrac{P_{eng}}{P_{sys}}\right); (P_{eng} \geq P_{sys}) \end{cases}$$

where $a_m$, $a_E$ are power lose converting coefficients for mechanical power path and electric power path, respectively;

$h_{eng}$ is the efficiency of engine;

$P_{eng}$ represents engine output power;

$P_{sys}$ represents total system power;

$m_{elc}$ represents the effective efficiency of the electric system and is a function of battery efficiency $h_{bat}$, electric drive efficiency $h_{inv}$, battery state-of-charge SOC, and battery charge or discharge power $P_{bat}$.

16. The method for controlling operation of a hybrid system according to claim 12 wherein further comprises means for determining and changing the engagement status of said clutches to effect different power-split configurations; the change in engagement status of clutches being made at one of the speed ratio node points where at least one electric machine has zero power.

17. The method for controlling operation of a hybrid system according to claim 12 wherein further comprises means for determining and effecting change in the engagement status of clutches; the change in engagement status of clutches being made under conditions where the first driven gear in the first pair of constant meshing gears and the second driven gear in the second pair of constant meshing gears are synchronized in rotational speed and the base torque of at least one electric machine is continuous.

18. The method for controlling operation of a hybrid system according to claim 12 wherein said means for engine speed control is implemented through a closed control loop including said engine, transmission, battery system and control units for said engine, transmission and battery system; said transmission further including a first and second electric machines along with their electric drive systems; said means for engine speed control being effected by calculating, setting and collaboratively controlling the operating torque of both the first and second electric machines.

* * * * *